(12) United States Patent
Suzuki

(10) Patent No.: US 11,112,020 B2
(45) Date of Patent: Sep. 7, 2021

(54) FUEL CONTROL VALVE

(71) Applicant: KYOSAN DENKI CO., LTD., Koga (JP)

(72) Inventor: Masakazu Suzuki, Koga (JP)

(73) Assignee: KYOSAN DENKI CO., LTD., Koga (JP)

( * ) Notice: Subject to any disclaimer, the term of this patent is extended or adjusted under 35 U.S.C. 154(b) by 89 days.

(21) Appl. No.: 16/562,627

(22) Filed: Sep. 6, 2019

(65) Prior Publication Data

US 2019/0390787 A1      Dec. 26, 2019

Related U.S. Application Data

(63) Continuation of application No. PCT/JP2018/001884, filed on Jan. 23, 2018.

(30) Foreign Application Priority Data

| Mar. 8, 2017 | (JP) | ................................. | 2017-004194 |
| Mar. 8, 2017 | (JP) | ............................. | JP2017-044191 |
| Mar. 8, 2017 | (JP) | ............................. | JP2017-044192 |
| Mar. 8, 2017 | (JP) | ............................. | JP2017-044193 |

(51) Int. Cl.
  *F16K 21/18*     (2006.01)
  *B60K 15/077*    (2006.01)
  *B60W 40/076*    (2012.01)

(52) U.S. Cl.
  CPC .......... *F16K 21/185* (2013.01); *B60K 15/077* (2013.01); *B60W 40/076* (2013.01); *B60K 2015/0772* (2013.01)

(58) Field of Classification Search
  CPC .. B60K 2015/0772; B60K 2015/03289; F16K 21/18; F16K 24/042; F16K 24/044; F16K 31/20; F16K 31/22; F16K 47/08; F16K 47/16; F16K 1/42; Y10T 137/2965; Y10T 137/3068; Y10T 137/3071;
  (Continued)

(56) References Cited

U.S. PATENT DOCUMENTS 6,250,330 B1 *   6/2001   Welker ...................... F16K 7/17
                                                                    137/489
2002/0046770 A1   4/2002   Hattori et al.
                    (Continued)

FOREIGN PATENT DOCUMENTS

JP          2002147632 A      5/2002
JP           200777934 A      3/2007
                    (Continued)

*Primary Examiner* — Hailey K. Do
(74) *Attorney, Agent, or Firm* — Harness, Dickey & Pierce, P.L.C.

(57) ABSTRACT

A fuel control valve includes a case and a movable body that is movably housed in the case. The case has a valve seat surface shaped in an inner cone shape whose inner diameter increases toward a tip. A valve element surface is operable by the movable body, and is in contact with the valve seat surface along a seal line in a valve closed state. The valve element surface is separated from the valve seat surface in a valve open state. Plural grooves are disposed between the tip and the seal line to expand radially outside from the valve seat surface. Plural projections are defined between the grooves to intermittently leave the valve seat surface.

12 Claims, 17 Drawing Sheets

(58) Field of Classification Search
CPC ......... Y10T 137/3099; Y10T 137/7423; Y10T 137/7426; Y10T 137/7436
See application file for complete search history.

(56) References Cited

U.S. PATENT DOCUMENTS

| | | | |
|---|---|---|---|
| 2004/0050418 A1* | 3/2004 | Yoshihara | B60K 15/03519 137/202 |
| 2010/0108155 A1 | 5/2010 | Kobayashi et al. | |
| 2014/0014869 A1* | 1/2014 | Fink | B60T 8/3615 251/359 |

FOREIGN PATENT DOCUMENTS

| | | | |
|---|---|---|---|
| JP | 2008275031 A | 11/2008 | |
| JP | 2016196245 A | 11/2016 | |

* cited by examiner

FUEL CONTROL VALVE

CROSS REFERENCE TO RELATED APPLICATION

The present application is a continuation application of International Patent Application No. PCT/JP2018/001884 filed on Jan. 23, 2018, which designated the U.S. and claims the benefit of priority from Japanese Patent Application No. 2017-44191 filed on Mar. 8, 2017, Japanese Patent Application No. 2017-44192 filed on Mar. 8, 2017, Japanese Patent Application No. 2017-44193 filed on Mar. 8, 2017, and Japanese Patent Application No. 2017-44194 filed on Mar. 8, 2017. The entire disclosures of all of the above applications are incorporated herein by reference.

TECHNICAL FIELD

The present disclosure relates to a fuel control valve.

BACKGROUND ART

A fuel control valve may include a float valve which responds to a liquid level of fuel, or a rollover valve which responds to a tilt angle of a vehicle.

SUMMARY

A fuel control valve includes a case and a movable body that is movably housed in the case. The case has a valve seat surface, and the movable body has a valve element surface. The valve element surface is in contact with the valve seat surface along a seal line in a valve closed state. The valve element surface is separated from the valve seat surface in a valve open state.

DETAILED DESCRIPTION

Figure 1:
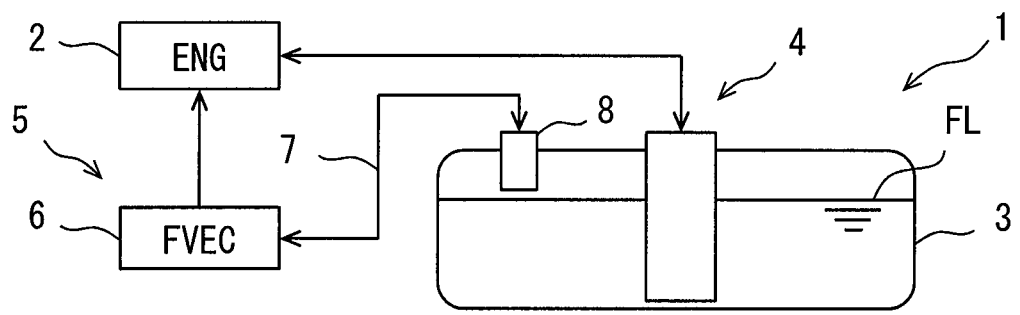
FIG. 1 is a block diagram illustrating a tank system according to a first embodiment.

To begin with, examples of relevant techniques will be described.

A fuel control valve has a fixed valve seat surface and a movable valve element surface, and a clearance is defined between the fixed valve seat surface and the movable valve element surface. The clearance defines an opening area when a valve is open. The movable valve element surface is operated by a movable body such as a float or a weight. In this case, in order to bring the movable valve element surface into contact with the fixed valve seat surface, the float or the weight is desirably guided near the fixed valve seat surface.

When the float floats on liquid fuel, the fuel control valve may tilt. In this case, the liquid level around the float also tilts. At this time, a part of the float floats up above the liquid level. The weight of the additional floating part acts so as to sink the entire float. Simultaneously, the other part of the float sinks below the liquid level. The additional sinking part pushes the liquid fuel away. Thus, the additional sinking part gives buoyancy to the float. Thus, the additional sinking part acts so as to allow the entire float to float up. As a result, the characteristics of the fuel control valve may change by the tilt of the fuel control valve.

For example, the position of the fuel control valve may change according to the difference between the weight of the additional floating part and the buoyancy given by the additional sinking part. For example, when the weight of the additional floating part is larger than the buoyancy of the additional sinking part, the entire float sinks. As a result, the fuel control valve may change from a valve closed state to a valve open state.

A rollover valve is made of a resin block in order to obtain a required mass. However, a large resin block obstructs heat release when the resin is cured. In another point of view, the large resin block adversely affects the dimension accuracy. On the other hand, when the resin block is made small, the required mass cannot be obtained. Thus, the productivity may be reduced.

The liquid surface of fuel may wave. In this case, it is difficult to block splashes from the waves to prevent an outflow of the fuel. When splashes are directed to the passage of the valve, the splashes may flow out. In the above point of view or another unmentioned point of view, a further improvement is demanded of the fuel control valve.

The present disclosure may provide a fuel control valve having a large opening area, a fuel control valve that is capable of guiding a movable valve element surface and also has a large opening area, a fuel control valve that reduces the influence of tilt, a fuel control valve that restrains a change in an open/closed state caused by tilt, a fuel control valve and a method for manufacturing the fuel control valve that are capable of resin-molding a movable body with high accuracy, a fuel control valve that is capable of restraining the outflow of liquid fuel and a method for manufacturing the fuel control valve, or a fuel control valve that prevents the outflow of liquid fuel.

According to an aspect of the present disclosure, a fuel control valve includes: a case that provides a passage extending from a tank for storing fuel; a movable body movably housed in the case to open or close the passage; a valve seat surface defined in the case to have an inner cone shape whose inner diameter increases toward a tip; a valve element surface that is operable by the movable body, the valve element surface being in contact with the valve seat surface along a seal line in a valve closed state, the valve element surface being separated from the valve seat surface in a valve open state; a plurality of grooves disposed between the tip and the seal line to expand radially outside from the valve seat surface; and a plurality of projections that are defined between the grooves to intermittently leave the valve seat surface.

The disclosure provides the fuel control valve capable of providing the valve closed state and the valve open state by the valve seat surface and the valve element surface. A plurality of grooves expand radially outside from the valve seat surface. Thus, in the valve open state, the opening area is defined by a clearance between the plurality of grooves and the valve element surface in addition to a clearance between the valve seat surface and the valve element surface. Thus, the fuel control valve having a large opening area is provided.

A fuel control valve disclosed herein includes a case that serves as a passage extending from a tank for storing fuel, and a movable body that is a float movably housed in the case and floating on a liquid level of liquid fuel and opens and closes the passage.

The movable body includes a sinking part that sinks below the liquid level in a normal attitude. The sinking part includes a first part having a predetermined diameter, the liquid level in the normal attitude passing through the first part, and a second part located below the first part and having a diameter equal to or larger than the diameter of the first part.

According to the disclosed fuel control valve, when the movable body floats in the normal attitude, the liquid level is located at the first part. The second part is located below the first part. The diameter of the second part is equal to or larger than the diameter of the first part. When the case and the movable body tilt, the liquid level moves with respect to the movable body. As a result, the radially outer part of the second part attempts to float up above the liquid level. However, since the second part is located below the first part, the capacity of the second part floating up from the liquid level is restrained. Further, since the diameter of the second part is equal to or larger than the diameter of the first part, the capacity of the first part floating up from the liquid level by the tilt is also restrained. As a result, the influence of the tilt is reduced.

A fuel control valve disclosed herein includes a case that serves as a passage extending from a tank for storing fuel, and a movable body that is a float movably housed in the case and floating on a liquid level of liquid fuel and opens and closes the passage.

The movable body includes a sinking part that sinks below the liquid level in a normal attitude and a floating part that floats up above the liquid level in the normal attitude. The floating part includes an additional sinking part that sinks below the liquid level in addition to the sinking part and gives buoyancy to the movable body in a tilt attitude tilted from the normal attitude. The sinking part includes an additional floating part that floats up above the liquid level in addition to the floating part and gives a weight against the buoyancy of the movable body in the tilt attitude. The movable body adjusts the buoyancy given by the additional sinking part and the weight given by the additional floating part.

According to the disclosed fuel control valve, there are cases where the movable body floats in the normal attitude and where the movable body floats in the tilt attitude. The additional floating part gives a weight to the movable body, and the additional sinking part gives buoyancy to the movable body. An adjusting shape adjusts the weight and the buoyancy. Thus, even when the attitude of the movable body changes from the normal attitude to the tilt attitude, it is possible to restrain a change in the buoyancy of the movable body. As a result, the influence of the tilt is reduced.

A fuel control valve disclosed herein includes a case that serves as a passage extending from a tank for storing fuel, and a movable body that is movably housed in the case and opens and closes the passage. The movable body is a molded article made of resin. The movable body includes a float chamber formed using a mold, and a plurality of through holes formed using the mold and penetrating the movable body in an up-down direction. The plurality of through holes are located radially outside the float chamber.

According to the disclosed fuel control valve, the movable body is a resin molded article. The movable body includes the float chamber and the plurality of through holes which are formed using the mold. The plurality of through holes are located radially outside the float chamber. The plurality of through holes provide an advantageous effect in the manufacturing process. In one point of view, the mold used in the manufacturing process supports heat release from a resin block. Thus, the movable body having high dimension accuracy is provided. Thus, the fuel control valve capable of resin-molding the movable body with high accuracy is provided.

A method for manufacturing a fuel control valve disclosed herein, the fuel control valve including a movable body that opens and closes a fuel vapor passage, includes: a heating step of heating resin, a molding step of molding the movable body from the heated resin using a mold made of metal, and a heat releasing step of releasing heat from the resin. The mold includes a base part, a rod-like part extending from the base part, a tubular part extending from the base part, and a plurality of pin parts that are located radially outside the rod-like part and extend higher than the tubular part. The molding step forms a float chamber located on the center of the movable body by the rod-like part, forms an annular part located radially outside the float chamber by the tubular part, and forms a plurality of through holes penetrating the movable body by the plurality of pin parts. The heat releasing step releases heat from the resin through the rod-like part, the tubular part, and the plurality of pin parts.

According to the disclosed fuel control valve, heat of the heated resin is released through the mold made of metal. Further, the mold includes the tubular part and the pin parts which are located radially outside the rod-like part. Thus, it is possible to effectively release heat also from the resin located radially outside the rod-like part. Thus, the movable body having high dimension accuracy is provided. Thus, it is possible to resin-mold the movable body with high accuracy.

A fuel control valve disclosed herein includes a case that serves as a passage extending from a tank for storing fuel, a movable body that is movably housed in the case and opens and closes the passage, and a plurality of barrier walls that are plate-like members disposed between the case and the movable body and extending between the case and the movable body, and surround the passage.

According to the disclosed fuel control valve, the plurality of barrier walls are disposed inside the case. The barrier walls obstruct the flow of splashes inside the case. Further, the barrier walls restrain waves inside the case. As a result, the outflow of liquid fuel from the fuel control valve is restrained.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

In FIG. 1, a tank system 1 includes a tank 3 which stores fuel for an engine (ENG) 2. The engine 2 is a power source of a vehicle, a ship, or an airplane. The tank system 1 is, for example, a vehicle tank system. In this case, the engine 2 includes an internal combustion engine. The fuel is supplied as liquid to the engine 2. However, the fuel may generate fuel vapor. The fuel is gasoline or diesel fuel.

The tank system 1 includes a fuel supply device 4 between the engine 2 and the tank 3. The fuel supply device 4 may be provided with an in-tank pump, a fuel filter, a fuel injection pump, and a fuel injection valve. The fuel inside the tank 3 is supplied to the engine 2 by the fuel supply device 4. The engine 2 combusts the fuel to provide power.

The tank system 1 includes a fuel vapor purifying system 5. The fuel vapor purifying system 5 supplies fuel vapor to the engine 2 to combust the fuel vapor. The fuel vapor purifying system 5 restrains discharge of fuel vapor to atmosphere. The fuel vapor purifying system 5 includes a fuel vapor emission control (FVEC) 6. The fuel vapor emission control 6 includes an accumulator which temporarily accumulates fuel vapor and a controller which supplies the accumulated fuel vapor to the engine 2 at a predetermined timing. For example, the accumulator includes activated carbon which adsorbs fuel vapor. The controller includes an electric control unit and a valve which introduces outside air for washout.

The fuel vapor purifying system 5 includes a fuel vapor passage 7 which allows a cavity inside the tank 3 and the fuel vapor emission control 6 to communicate with each other. The fuel vapor passage 7 guides fuel vapor generated inside the tank 3 to the fuel vapor emission control 6. The fuel vapor passage 7 also supplies outside air to the tank 3. The fuel vapor passage 7 extends from the tank 3.

The fuel vapor purifying system 5 includes a fuel control valve 8. The fuel control valve 8 allows passage of fuel vapor and air. The fuel control valve 8 restrains liquid fuel flowing out to the fuel vapor emission control 6 from the tank 3. Liquid fuel flowing into the fuel vapor passage 7 may generate a large amount of fuel vapor. In this case, the fuel vapor emission control 6 may be saturated. Thus, it is desired to minimize the outflow of liquid fuel. The fuel control valve 8 is disposed on the fuel vapor passage 7. The fuel control valve 8 is fixed to the tank 3. FIG. 1 illustrates a liquid level FL of the liquid fuel.

When the fuel vapor emission control 6 is provided with a control unit, the control unit is an electronic control unit. The control unit includes at least one processing unit (CPU) and at least one memory unit as a storage medium which stores a program and data. The control unit includes a microcomputer which is provided with a storage medium readable by a computer. The storage medium is a non-transitory tangible storage medium which nontemporarily stores a program readable by a computer. The storage medium may include a semiconductor memory or a magnetic disk. The control unit may include a single computer or a set of computer resources linked by a data communication device. The program is executed by the control unit to cause the control unit to function as the device described in the present specification and cause the control unit to execute the method described in the present specification.

Means and/or a function of the control unit can be implemented by software recorded in a tangible memory unit and a computer that executes the software, software only, hardware only, or a combination thereof. For example, when the control unit is an electronic circuit which is hardware, the electronic circuit may include a digital circuit including a large number of logical circuits or an analog circuit.

Figure 2:
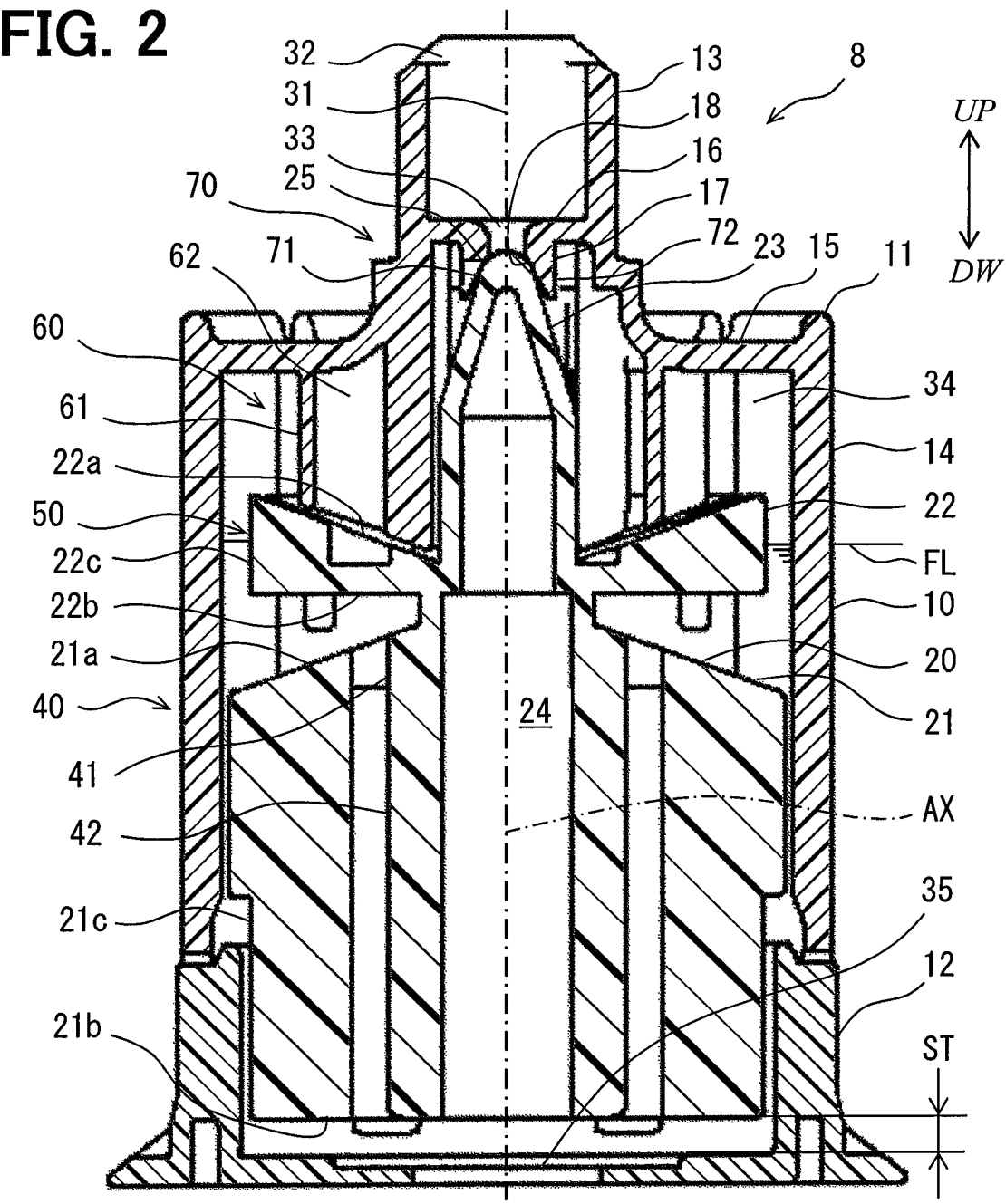
FIG. 2 is a cross-sectional view illustrating a fuel control valve according to the first embodiment.

FIG. 2 illustrates the fuel control valve 8 in a normal attitude. In the following description, up, down, an upward direction UP, and a downward direction DW are based on the normal attitude. The fuel control valve 8 is a so-called rollover valve. The fuel control valve 8 is a gravity valve which responds to gravity. The fuel control valve 8 may be called various names such as a liquid fuel shutoff valve and a float valve. FIG. 2 illustrates a valve closed state. FIG. 2 illustrates the upward direction UP and the downward direction DW. FIG. 2 illustrates a central axis AX of the fuel control valve 8. FIG. 2 illustrates an example of the liquid level FL of fuel.

The fuel control valve 8 includes a case 10 and a movable body 20. The case 10 is made of resin. The case 10 defines and forms the fuel vapor passage 7 which extends from the tank 3. The case 10 serves as a fixed valve seat surface. The case 10 serves as a container which houses the movable body 20 therein. The case 10 also serves as a guide member which guides movement of the movable body 20. The case 10 also serves as a cover which blocks splashes of the liquid fuel inside the tank 3.

The movable body 20 opens and closes the fuel vapor passage 7. The fuel control valve 8 provides a valve open state and a valve closed state according to the position of the movable body 20. When the movable body 20 is located at an upper end position, the fuel control valve 8 provides the valve closed state. When the movable body 20 is located at a lower end position, the fuel control valve 8 provides the valve open state. When the movable body 20 is located at a position other than the upper end position, the fuel control valve 8 provides the valve open state. The movable body 20 also serves as an operation member which operates the fuel control valve 8 to a valve open state or a valve closed state.

The movable body 20 is made of resin. The movable body 20 is a resin molded article. The resin is a thermoplastic resin. Examples of the resin include polyacetal (POM) or polycarbonate (PC). The movable body 20 is movable inside the case 10. The movable body 20 is movable up and down, that is, along the central axis AX within a moving range ST. The movable body 20 includes a valve element surface which comes into contact with or moves away from the valve seat surface to close or open the fuel vapor passage 7.

The movable body 20 moves according to a tilt angle of the tank 3, that is, by gravity. The movable body 20 has a mass movable by gravity. The movable body 20 is capable of floating on the liquid fuel in the illustrated normal attitude. The movable body 20 floats on the liquid fuel when at least a part of the movable body 20 sinks in the liquid fuel. The movable body 20 includes an air chamber for floating on the liquid fuel and moving. The movable body 20 is also called a float. The movable body 20 is also called a movable valve element.

When the tilt angle of the tank 3 is smaller than a predetermined angle, the fuel control valve 8 provides the valve open state. When the tilt angle of the tank 3 is larger than the predetermined angle, the fuel control valve 8 provides the valve closed state. For example, when the vehicle has rolled over, the movable body 20 does not float on the liquid fuel. In this case, the fuel control valve 8 provides the valve closed state.

When the tilt angle of the tank 3 is smaller than the predetermined angle and the liquid level FL of the liquid fuel is sufficiently low, the fuel control valve 8 provides the valve open state. When the tilt angle of the tank 3 is smaller than the predetermined angle and the liquid level FL of the liquid fuel is sufficiently high, the fuel control valve 8 provides the valve closed state. Accordingly, even when the liquid level FL of the liquid fuel inside the tank 3 is high, the outflow of the liquid fuel is restrained.

The case 10 includes a first case 11 and a second case 12. The first case 11 is a resin molded article. The first case 11 includes a small-diameter part 13, a large-diameter part 14, and a step part 15. The small-diameter part 13 has a predetermined diameter. The small-diameter part 13 serves as an outlet pipe. The small-diameter part 13 is also a part serving as a valve. The large-diameter part 14 has a larger diameter than the small-diameter part 13. The large-diameter part 14 houses the movable body 20 therein. The large-diameter part 14 defines a housing chamber 34 which houses the movable body 20 therein. The step part 15 connects the small-diameter part 13 and the large-diameter part 14 to each other. The step part 15 connects the lower end of the small-diameter part 13 and the upper end of the large-diameter part 14 to each other. The step part 15 closes a space between the lower end of the small-diameter part 13 and the upper end of the large-diameter part 14. The first case 11 may include a vent hole.

The small-diameter part 13 includes a partition wall 16. The partition wall 16 is disposed inside the small-diameter part 13 to vertically partition a cavity inside the small-diameter part 13. The partition wall 16 also serves as an inner flange. The small-diameter part 13 includes a tubular part 17. The tubular part 17 is supported by the partition wall 16. The tubular part 17 serves as a passage extending in the up-down direction. The tubular part 17 extends downward from the partition wall 16. The tubular part 17 projects from the partition wall 16 toward the large-diameter part, that is, in the downward direction DW. The shape helps a return flow of the liquid fuel into the tubular part 17 from a position above the partition wall 16.

The upper end of the tubular part 17 is continuous with the partition wall 16. The lower end of the tubular part 17 is open toward the movable body 20. A fixed valve seat surface 18 is formed inside the lower end of the tubular part 17. The valve seat surface 18 is the inner side face of the tubular part 17. The valve seat surface 18 is an inner expanded surface expanding downward. The valve seat surface 18 has an inner cone shape whose inner diameter increases toward the tip. The valve seat surface 18 is a tapered surface having a linear inner expanded surface. The valve seat surface 18 may be a curved surface.

The small-diameter part 13 has a tubular shape. The small-diameter part 13 has a larger inner diameter than the tubular part 17. Thus, a tubular cavity closed by the partition wall 16 is formed between the small-diameter part 13 and the tubular part 17. The small-diameter part 13 defines and forms a cavity as an outlet passage 31 inside thereof. The outlet passage 31 is formed between an outlet opening 32 and the partition wall 16. The small-diameter part 13 has a tubular shape or a bottomed tubular shape including the partition wall 16 as a bottom. The tubular part 17 defines and forms a valve passage 33 which is opened and closed by the fuel control valve 8. The valve passage 33 is defined by a convex curved surface. The valve passage 33 includes an inner face smoothly expanding in the upward direction UP. The valve passage 33 expands in the downward direction DW by the valve seat surface 18.

The large-diameter part 14 has a tubular shape. The large-diameter part 14 defines and forms a cavity as a housing chamber 34 inside thereof. The large-diameter part 14 houses the movable body 20 therein. The second case 12 is disposed on the lower end of the large-diameter part 14.

The second case 12 is disposed on the lower end of the first case 11. The second case 12 is connected to the lower end of the large-diameter part 14. In the present embodiment, the first case 11 and the second case 12 are connected by snap-fit. The first case 11 and the second case 12 may be connected using a connecting method such as a screw, a separate retainer, or welding. The second case 12 serves as the bottom of the case 10. The second case 12 covers the lower end of the large-diameter part 14. The second case 12 defines and forms a lower opening 35. The lower opening 35 is a principal inlet into the case 10. The lower opening 35 functions as an inlet for the liquid fuel.

The movable body 20 includes a main body 21, a flange part 22, and a needle part 23. The main body 21 has a tubular shape. The main body 21 includes an upper face 21a, a lower face 21b, and an outer side face 21c. The upper face 21a is inclined downward toward radially outside. The upper face 21a corresponds to a liquid level assumed at a tile angle allowed for the fuel control valve 8.

The flange part 22 is located above the main body 21 in the upward direction UP. The flange part 22 is separated from the main body 21. The flange part 22 is located between the main body 21 and the needle part 23. The flange part 22 extends radially outside on the base part of the needle part 23.

The flange part 22 includes an upper face 22a, a lower face 22b, and an outer side face 22c. The upper face 22a is inclined downward toward radially inside. The upper face 22a corresponds to the liquid level assumed at the tilt angle allowed for the fuel control valve 8. The lower face 22b horizontally expands in the illustrated normal attitude. The diameter of the outer side face 22c is smaller than the diameter of the main body 21. The flange part 22 includes plural fuel passages which penetrate the flange part 22 in the up-down direction. The fuel passages restrain the liquid fuel from accumulating on the upper face 22a. The flange part 22 is a rotary body having a triangle cross section.

The needle part 23 is tapered in the upward direction UP. The needle part 23 includes a movable valve element surface 25 which is constituted of a curved surface on the tip part thereof. The fuel control valve 8 provides the valve closed state by contact between the valve seat surface 18 and the valve element surface 25. The fuel control valve 8 provides the valve open state by separation between the valve seat surface 18 and the valve element surface 25.

The tip of the needle part 23 is inserted into the valve seat surface 18. The tip of the needle part 23 is guided by the valve seat surface 18 and located on the central axis AX. Thus, a range near the opening end in the valve seat surface 18 functions as a guide surface which guides the needle part 23.

The main body 21, the flange part 22, and the needle part 23 define and form a float chamber 24 on the center. The float chamber 24 is closed in the upward direction UP. The float chamber 24 is open on the lower face 21b in the downward direction DW. The movable body 20 serves as a cap-like float which generates buoyancy only in the normal attitude.

The fuel control valve 8 has a support shape 40. The main body 21 can be called a large resin block. The main body 21 defines and forms plural through holes 41. The support shape 40 is constituted of the plural through holes 41. The plural through holes 41 are distributed inside the main body 21. The plural through holes 41 are located inside a relatively thick resin. The plural through holes 41 extend in the up-down direction. The plural through holes 41 communicate with the upper face 21a and the lower face 21b of the main body 21. The plural through holes 41 are open on the upper face 21a. The plural through holes 41 are not open on the outer side face 21c of the main body 21. The openings of the plural through holes 41 on the upper face 21a are located under the flange part 22. The plural through holes 41 are located radially outside the float chamber 24.

A method for manufacturing the fuel control valve 8 includes a step of molding the movable body 20 with resin. In this step, the plural through holes 41 are formed using a mold. Thus, each of the plural through holes 41 has a molded shape. Each of the plural through holes 41 has a mold trace for removing the mold.

The mold located inside the plural through holes 41 takes heat of the resin away in the molding step. The mold located inside the plural through holes 41 accelerates release of heat of the resin. Thus, the movable body 20 is molded of a relatively thick resin layer. The relatively thick resin layer gives a required mass to the movable body 20.

The plural through holes 41 include an annular part 42 which is continuous in the circumferential direction. The annular part 42 may communicate with the float chamber 24. In this case, the annular part 42 can function as an auxiliary chamber for the float chamber 24. The annular part 42 may be used as a housing chamber for housing a spring.

The plural through holes 41 also function as passages. Air or a part of the fuel passes through the plural through holes 41. The valve seat surface 18 and the valve element surface 25 serve as a valve. Openings of the plural through holes 41 on the upper face 21a are separated from the valve in the up-down direction. Thus, it is hard for splashes of fuel to reach the valve.

The flange part 22 is disposed between the plural openings of the plural through holes 41 and the valve. The flange part 22 serves as a barrier member which restrains the liquid fuel blown out of the plural through holes 41 from reaching the valve. Thus, it is hard for splashes of fuel to reach the valve.

The plural openings of the plural through holes 41 on the upper face 21a are open radially outside the float chamber 24. Thus, the plural openings of the plural through holes 41 on the upper face 21a are separated from the valve in the radial direction. Thus, it is hard for splashes of fuel to reach the valve. The upper face 21a is inclined radially outside. Thus, it is hard for splashes of fuel to reach the valve.

In the above point of view, the support shape 40 supports resin molding of the movable body 20. The support shape 40 facilitates resin molding of the movable body 20. In another point of view, the support shape 40 supports a function of restraining fuel splashes from reaching the valve. In this manner, the support shape 40 supports the resin molding step and/or the fuel outflow restraint.

The fuel control valve 8 includes a buoyancy adjusting mechanism 50. The buoyancy adjusting mechanism 50 mainly includes the flange part 22. The buoyancy adjusting mechanism 50 adjusts the buoyancy of the movable body 20 when the movable body 20 functions as a float. The flange part 22 adjusts the buoyancy of the movable body 20 in plural points of view.

First, the flange part 22 improves the stability on the liquid level FL when the movable body 20 functions as a float. In other words, the flange part 22 adjusts the responsivity of the movable body 20. When the movable body 20 floats on the liquid level FL, the flange part 22 is located across the liquid level FL in the up-down direction.

When the movable body 20 moves to above the liquid level FL, the flange part 22 generates a relatively large volume shift to above the liquid level FL. Thus, the movable body 20 increases a weight acting in the downward direction DW against the movement in the upward direction UP and loses buoyancy. When the movable body 20 moves to below the liquid level FL, the flange part 22 generates a relatively large volume shift to below the liquid level FL. Thus, the movable body 20 reduces a weight acting in the downward direction DW against the movement in the downward direction DW and gains buoyancy. In this manner, the buoyancy of the movable body 20 is adjusted against float and sink of the movable body 20. When the flange part 22 is not present, a buoyancy change caused by float and sink of the movable body 20 depends on a volume change generated by the needle part 23 with respect to the liquid level FL. Thus, the amount of buoyancy adjustment is small. On the other hand, since the flange part 22 is thicker than the needle part 23, the flange part 22 generates a relatively large volume change. As a result, the position of the movable body 20 on the liquid level FL is stabilized.

Next, when the movable body 20 functions as a float, the flange part 22 restrains a buoyancy change caused by the tilt angle. When the tilt angle of the central axis AX increases, one side part of the flange part 22 additionally floats up above the liquid level FL. Simultaneously, the other side part of the flange part 22 additionally sinks below the liquid level FL. At this time, the movable body 20 increases a weight acting in the downward direction DW according to the volume of the additional floating part and loses buoyancy. Simultaneously, the movable body 20 reduces a weight acting in the downward direction DW according to the volume of the additional sinking part and gains buoyancy. The shape of the flange part 22 defined by the upper face 22a, the lower face 22b, and the outer side face 22c is set so that the additional floating part and the additional sinking part are balanced with each other.

The fuel control valve 8 includes a barrier mechanism 60. The barrier mechanism 60 includes plural barrier walls 61 and plural barrier passages 62. The plural barrier walls 61 are plate-like members. The plural barrier walls 61 define the plural barrier passages 62 therebetween. The plural barrier walls 61 are formed inside the first case 11. The plural barrier walls 61 are resin-molded integrally with the first case 11. The plural barrier walls 61 are also called plural wave dissipating plates or plural baffle plates.

The plural barrier walls 61 extend from the radially inside of the small-diameter part 13 in the up-down direction, that is, along the central axis AX. The plural barrier walls 61 extend in the downward direction DW from the small-diameter part 13 and the step part 15.

The plural barrier walls 61 are located between the case 10 and the movable body 20. The plural barrier walls 61 extend facing the movable body 20. The plural barrier walls 61 come into contact with the movable body 20 in the valve closed state or form minute clearances between the barrier walls 61 and the movable body 20 in the valve closed state in the up-down direction. The plural barrier walls 61 face the upper face 22a with minute clearances therebetween in the up-down direction. The plural barrier walls 61 allow the movable body 20 to move between the valve open state and the valve closed state. The plural barrier walls 61 are located in a cavity between the case 10 and the movable body 20 near the valve closed state.

The small-diameter part 13 and the step part 15 are connected through a smooth curved surface. The plural barrier walls 61 extend along the smooth curved surface. The plural barrier walls 61 slightly project radially inward from the inner side face of the small-diameter part 13. The plural barrier walls 61 are separated from the tubular part 17. The plural barrier walls 61 extend from the inner side of the small-diameter part 13 in the radial direction. The plural barrier walls 61 extend along the step part 15 in the radial direction. The plural barrier walls 61 extend within the range of the step part 15 in the radial direction. The plural barrier walls 61 do not extend up to the large-diameter part 14 in the radial direction. The plural barrier walls 61 are located radially outside the tubular part 17. The plural barrier walls 61 overlap each other in the radial direction. The barrier wall 61 also serves as barrier member which obstructs a linear flow from the radially outside toward the radially inside.

The plural barrier walls 61 define and form the plural barrier passages 62 therebetween. The barrier passages 62 extend from the radially outside toward the radially inside with respect to the central axis AX.

The fuel control valve 8 includes a flow regulating mechanism 70. When the movable body 20 moves from the valve closed state to the valve open state, the flow regulating mechanism 70 rapidly increases a flow rate. That is, the flow regulating mechanism 70 largely increases the flow rate by only a slight movement of the movable body 20 from the valve closed state. In the valve open state, the flow regulating mechanism 70 provides a large opening area.

The flow regulating mechanism 70 includes plural grooves 71 formed on the tubular part 17. The plural grooves 71 are disposed on an open end of the valve seat surface 18. The plural grooves 71 are disposed only on the open end of the valve seat surface 18. The plural grooves 71 are disposed on the open end side relative to a seal line where the valve seat surface 18 comes into contact with the valve element surface 25 in the valve seat surface 18. The plural grooves 71 do not extend up to the seal line. As a result, flows through the plural grooves 71 are allowed only by a slight lift of the valve element surface 25 from the valve seat surface 18. A large flow rate increase can be obtained by allowing not only a flow along the valve seat surface 18, but also the flows through the plural grooves 71. On the other hand, when the valve element surface 25 approaches the valve seat surface 18, the flow is rapidly interrupted from the high flow rate.

The plural grooves 71 divide the edge of the open end of the valve seat surface 18 into plural projections 72. The plural projections 72 come into contact with the needle part 23. The plural projections 72 guide the needle part 23. In this point of view, the flow regulating mechanism 70 also serves as a guide mechanism. The plural projections 72 guide the valve element surface 25 to the seal line on the valve seat surface 18.

Figure 3:
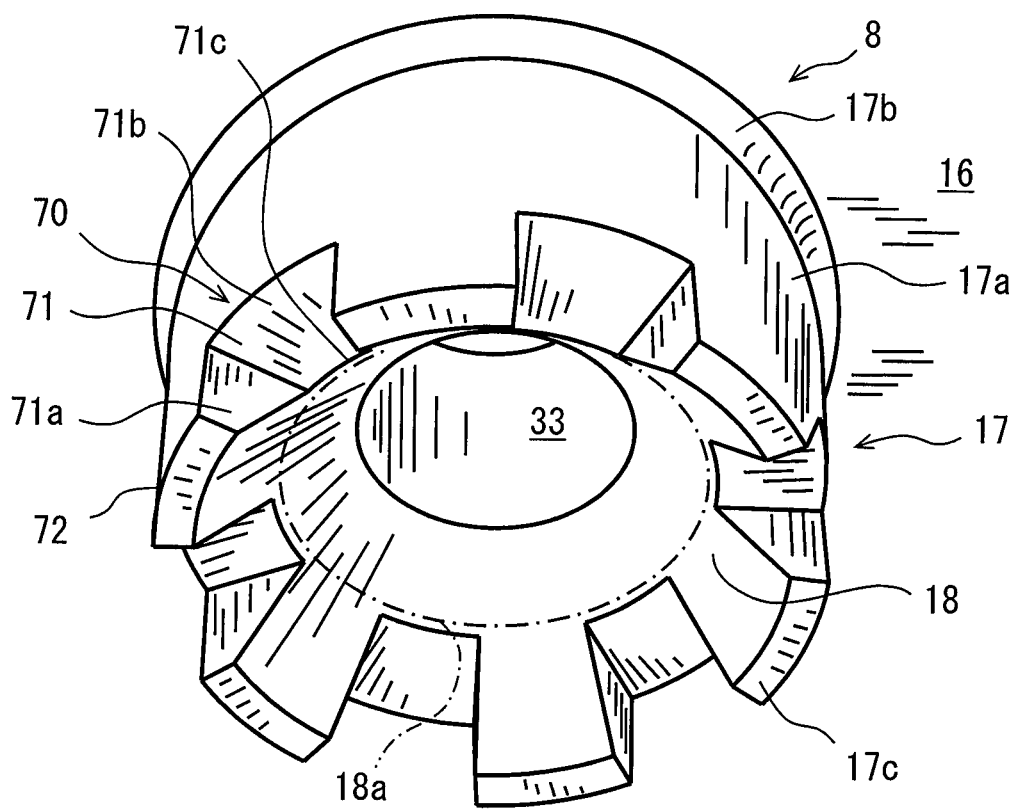
FIG. 3 is a perspective view illustrating a tubular part according to the first embodiment.

The flow regulating mechanism 70 will be described in detail with reference to FIG. 3. FIG. 3 is a perspective view of the tubular part 17 inside the first case 11. Further, FIG. 3 illustrates a seal line 18a where the fixed valve seat surface 18 and the movable valve element surface 25 come into contact with each other.

The tubular part 17 projects in the axial direction from the partition wall 16. The tubular part 17 projects in the downward direction DW from the partition wall 16. A cylindrical cavity is formed between the small-diameter part 13 and the tubular part 17 under the partition wall 16 in the downward direction DW. The tubular part 17 has a cylindrical shape. The tubular part 17 includes an outer side face 17a having a columnar shape. The tubular part 17 includes a curved surface part 17b which smoothly connects the outer side face 17a and the partition wall 16 to each other. The tubular part 17 includes plural tip faces 17c on the open end. Each of the tip faces 17c is a fan-shaped plane obtained by dividing an annular plane by the plural grooves 71.

The tubular part 17 includes the valve seat surface 18 extending in the axial direction from the open end. The valve seat surface 18 has a truncated cone shape. The valve seat surface 18 is also called an inner tapered surface. The valve passage 33 communicates with the upper end of the valve seat surface 18. A large-diameter end of the valve seat surface 18 is open on the tip face of the tubular part 17. A small-diameter end of the valve seat surface 18 communicates with the valve passage 33. The seal line 18a is located on an intermediate part of the valve seat surface 18 in the axial direction. The seal line 18a has a perfect annular shape.

The tip part of the tubular part 17 includes the plural grooves 71 and the plural projections 72. The plural grooves 71 are disposed on the tip side relative to the seal line 18a. The plural grooves 71 expand radially outside from the valve seat surface 18. The plural grooves 71 are radially formed. The plural projections 72 are formed between the plural grooves 71. The valve seat surface 18 is intermittently left on the inner side of the plural projections 72.

All the plural grooves 71 have the same shape. The grooves 71 penetrate the tubular part 17 from the inner side to the outer side in the radial direction. The grooves 71 are also recesses open on the tip of the tubular part 17. The grooves 71 are open on the outer side face 17a. The grooves 71 are open on the valve seat surface 18. Each of the plural grooves 71 is defined by two side faces 71a and a bottom face 71b located between the two side faces 71a. Each of the projections 72 includes the tip face 17c. Each of the projections 72 is also formed between the side face 71a and the side face 71a. Thus, the plural grooves 71 are intermittently formed in the circumferential direction.

The groove 71 includes an edge 71c on the radially inside. The edge 71c is located between the bottom face 71b and the valve seat surface 18. The edge 71c is located on the open end side relative to the seal line 18a. The edges 71c are located immediately near the seal line 18a on the tip side relative to the seal line 18a. The plural edges 71c are annularly disposed. Intersections between the bottom faces 71b and the valve seat surface 18 correspond to the plural edges 71c each having a curved surface shape. The edge 71c is slightly round so as to prevent a strong collision with the valve element surface 25. The edge 71c has a curved surface which smoothly connects the bottom face 71b and the valve seat surface 18 to each other.

In the illustrated example, the tubular part 17 includes six grooves 71 and six projections 72 on the tip part thereof. The tip part of the tubular part 17 is formed in a crown shape by the grooves 71 and the projections 72. In other words, the tip part of the tubular part 17 has a shape having projections and recesses in the circumferential direction.

The seal line 18a is located slightly on the deep side relative to the edges 71c. The seal line 18a may be located at the same position as the edges 71c. The seal line 18a is desirably disposed immediately near the edges 71c.

Figure 4:
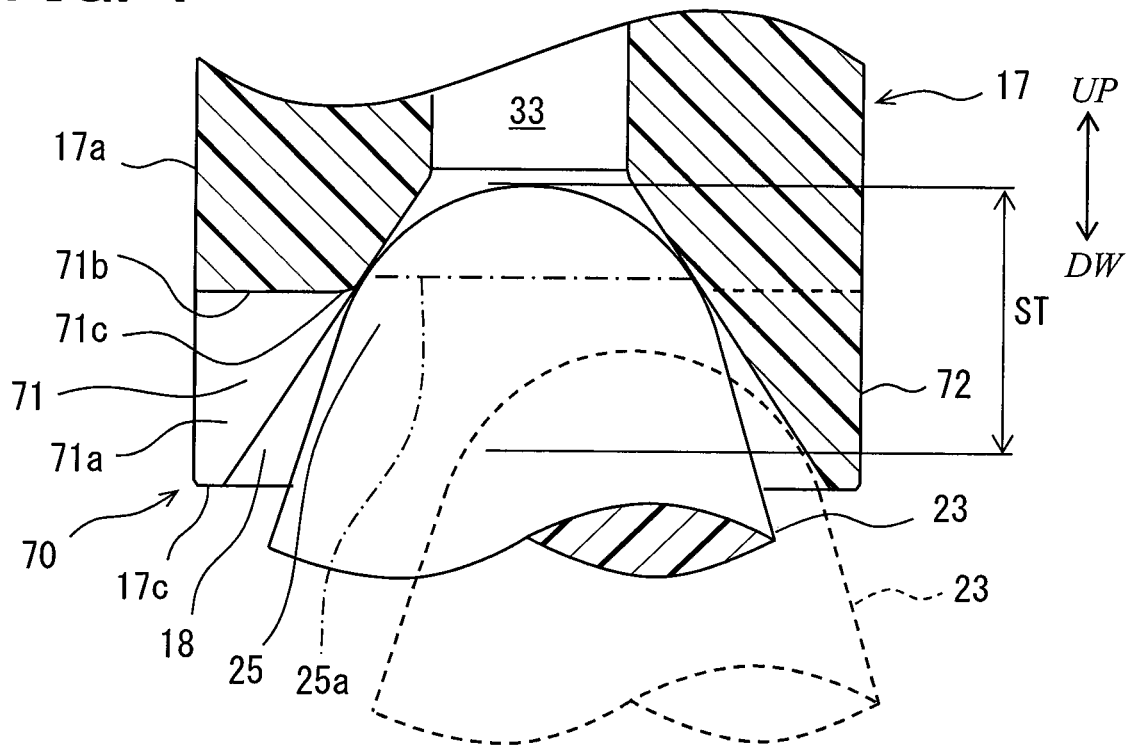
FIG. 4 is a cross-sectional view illustrating a valve seat surface and a valve element surface according to the first embodiment.

FIG. 4 illustrates the tubular part 17 and the needle part 23. FIG. 4 illustrates a valve closed state. A broken line indicates, as an example, the position of the needle part 23 in the valve open state. FIG. 4 illustrates a moving range ST of the movable body 20, that is, the moving range ST of the needle part 23.

The valve element surface 25 is operable by the movable body 20. The valve element surface 25 comes into contact with the valve seat surface 18 at a seal line 25a in the valve closed state. In other words, the valve element surface 25 comes into contact the seal line 18a of the valve seat surface 18 in the valve closed state. The valve element surface 25 is separated from the valve seat surface 18 in the valve open state. The seal line 25a has a perfect annular shape.

The needle part 23 extends toward the valve seat surface 18. The valve element surface 25 is formed on the tip part of the needle part 23. The tip part of the needle part 23 is located inside the tubular part 17 over the entire area of the moving range ST. The plural projections 72 extend longer than the moving range ST of the valve element surface 25. The valve element surface 25 on the tip part of the needle part 23 is contactable with the valve seat surface 18. The tip part of the needle part 23 is contactable with the valve seat surface 18 expanding above the projections 72. In the valve open state, the valve seat surface 18 left on the plural projections 72 is in contact with the valve element surface 25. In the valve open state, the valve seat surface 18 left on the plural projections 72 guides the valve element surface 25. Thus, when the needle part 23 moves in the upward direction UP and the downward direction DW, the tip part of the needle part 23 moves along the valve seat surface 18. In particular, the valve seat surface 18 extending along the plural projections 72 serves as a guide surface which guides the needle part 23. In this point of view, the plural projections 72 also serve as guide members. The plural valve seat surface 18 left on the projections 72 guides the valve element surface 25 on the tip part of the needle part 23. Accordingly, it is possible to guide the movable body 20 on the end of the movable body 20.

The edge 71c is formed between the bottom face 71b of the groove 71 and the valve seat surface 18. The edge 71c has a curved surface which smoothly connects the bottom face 71b and the valve seat surface 18 to each other. The curved surface contributes to restraining a collision between the valve element surface 25 and the edge 71c. For example, even when the needle part 23 moves from the valve open state to the valve closed state along the inside of the groove 71, damage caused by a collision of the valve element surface 25 with the edge 71c is restrained. The needle part 23 is rotatable about the central axis AX with respect to the tubular part 17. Thus, wear caused by the needle part 23 making contact with the same position in the tubular part 17 is restrained.

The seal line 18a disposed immediately near the edge 71c contributes to preventing damage of the valve element surface 25 caused by the edge 71c. The needle part 23 may be guided from a valve open position to a valve closed position while being located inside the groove 71. Also in this case, the needle part 23 is located on the valve seat surface 18 before the seal line 18a. Thus, a collision between the edge 71c and the valve element surface 25 is restrained.

The plural grooves 71 provide a large opening area merely by a slight movement of the needle part 23 in a valve opening direction from the valve closed position. When the valve element surface 25 is lifted from the valve closed state, the opening area is limited while the entire seal line 25a faces the valve seat surface 18. However, when the seal line 25a faces the plural grooves 71, the plural grooves 71 rapidly increase the opening area. In this manner, in the fuel control valve 8, the opening area in the valve open state is defined by the plural grooves 71 and the plural projections 72 facing the valve element surface 25. Thus, the opening area has a toothed wheel shape. As a result, the fuel control valve 8 having a large opening area is provided. The plural projections 72 include the valve seat surface 18 inside thereof. Thus, it is possible to guide the movable valve element surface 25.

According to the embodiment described above, since the plural grooves 71 are formed, a large opening area is obtained in the valve open state. As a result, the fuel control valve having a large opening area is provided. The plural projections 72 guide the movable valve element surface 25. Thus, a guide function is not lost.

The buoyancy adjusting mechanism 50 will be described in detail with reference to FIGS. 5, 6, 7, and 8. These drawings illustrate the movable body 20. The movable body 20 includes the buoyancy adjusting mechanism 50. The buoyancy adjusting mechanism 50 reduces the influence of tilt.

Figure 6:
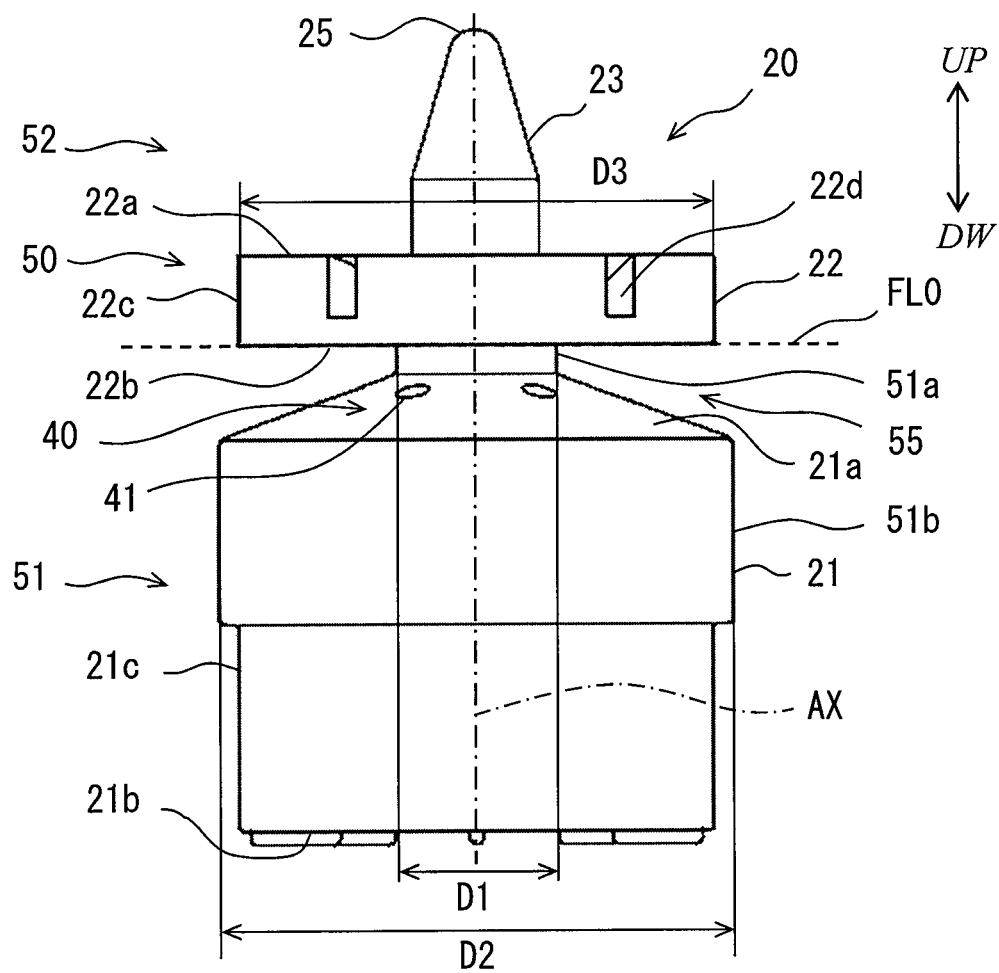
FIG. 6 is a side view illustrating the movable body according to the first embodiment.

FIG. 6 illustrates one liquid level FL0 of liquid fuel. The liquid level of the liquid fuel moves up and down inside the case 10. When the liquid level gradually rises and comes to a height indicated by the liquid level FL0 with respect to the movable body 20, the movable body 20 floats on the liquid fuel. In the present embodiment, the moving range of the movable body 20 is limited inside the case 10. Thus, the liquid level may further rise. Thus, the liquid level FL0 is the lowest height at which the movable body 20 can freely float on the liquid fuel. The liquid level FL0 is also called a floating liquid level. A state in which the central axis AX of the movable body 20 is aligned with the upward direction UP and the downward direction DW as illustrated can be called the normal attitude of the movable body 20. The liquid level FL0 is defined by buoyancy given to the movable body 20 in the normal attitude. The position of the liquid level FL0 can be adjusted by the weight of the movable body 20, the displacement of the movable body 20, and the capacity of the air chamber including the float chamber 24.

The movable body 20 includes a sinking part 51 which sinks below the liquid level FL0 in the normal attitude. In other words, the movable body 20 includes the sinking part 51 which sinks below the liquid level FL0 and defines the displacement when the movable body 20 floats on the liquid fuel. The sinking part 51 of the movable body 20 includes the main body 21. The sinking part 51 is located below the flange part 22.

The sinking part 51 includes a first part 51a. The first part 51a has a predetermined diameter D1. The first part 51a may have a polygonal shape. As illustrated, the liquid level FL0 in the normal attitude passes through the first part 51a. In other words, when the movable body 20 floats on the liquid level FL0, the liquid level FL0 is located at the first part 51a. The diameter D1 is the diameter of the intersection between the liquid level FL0 and the movable body 20 when the movable body 20 in the normal attitude freely floats on the liquid fuel. The diameter D1 defines the area of the movable body 20 intersecting the liquid level FL0. The first part 51a is a tubular part including the float chamber 24 inside thereof.

The sinking part 51 includes a second part 51b which is located below the first part 51a. The second part 51b has a diameter D2 which is larger than or equal to the diameter of the first part 51a (D1 D2). The second part 51b is constituted of the main body 21. The second part 51b is located below the liquid level FL0 by the length of the first part 51a.

When the diameter D2 of the second part 51b is larger than the diameter D1 of the first part 51a (D1<D2), the second part 51b has a shoulder part. The distance between the first part 51a and the shoulder part restraints the shoulder part from floating up above the liquid level FL0 when the movable body 20 tilts from the normal attitude. The second part 51b includes the upper face 21a. The upper face 21a has a truncated cone shape expanding downward. The inclination of the upper face 21a from the liquid level FL0 restrains the sinking part 51 from floating up above the liquid level FL0. The inclination of the upper face 21a corresponds to the maximum inclination angle capable of restraining the floating-up of the shoulder part.

The movable body 20 includes a floating part 52 which floats up from the liquid level FL0 in the normal attitude. In other words, the movable body 20 includes the floating part 52 which projects above the liquid level FL0 when the movable body 20 floats on the liquid fuel. The floating part 52 is located above the first part 51a. The floating part 52 includes the flange part 22. The floating part 52 includes the needle part 23. The flange part 22 has a diameter D3 which is larger than or equal to the diameter D1 of the first part 51a (D1<D3). The diameter D3 of the flange part 22 is smaller than the diameter D2 of the second part 51b (D3<D2).

The flange part 22 is located immediately above the liquid level FL0. The liquid level FL0 is in contact with the lower face 22b. The liquid level FL0 may be located slightly above the lower face 22b or slightly below the lower face 22b. The liquid level FL0 is located near the lower face 22b. The flange part 22 generates buoyancy against a force that moves the entire movable body 20 downward. In the illustrated state, a case where the movable body 20 moves in the downward direction DW will be considered. In this case, a capacity defined by the diameter D3 of the flange part 22 sinks in the liquid fuel. That is, the displacement increases. Thus, buoyancy against the movement in the downward direction DW is newly generated in the movable body 20. Thus, a size in the liquid level FL0 affects the stability of the movable body 20. In the present embodiment, the flange part 22 is located immediately above the liquid level FL0. Thus, the flange part 22 provides buoyancy against the movement in the downward direction DW. When the movable body 20 moves in the downward direction DW, buoyancy generated by the first part 51a is small. However, the buoyancy generated by the flange part 22 supplements the buoyancy generated by the first part 51a and contributes to improving the stability of the movable body 20. Thus, the diameter D3 of the flange part 22 is desirably larger than the diameter D1 of the first part 51a.

Figure 7:
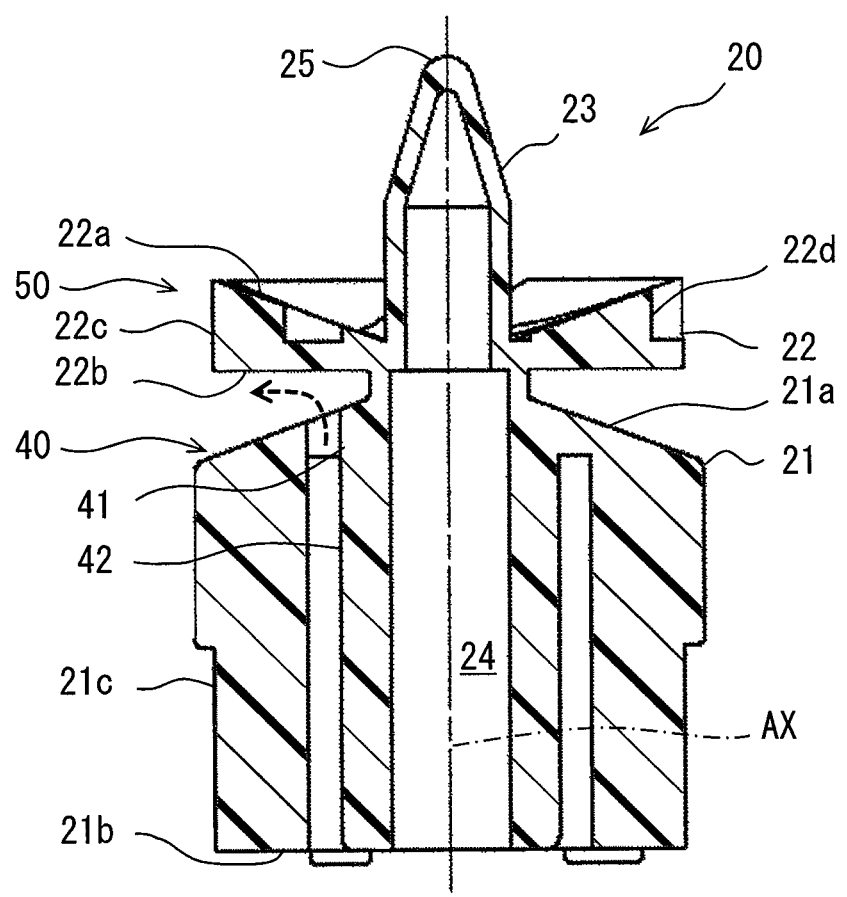
FIG. 7 is a cross-sectional view illustrating the movable body according to the first embodiment.

In FIG. 7, the upper face 22a of the flange part 22 has a funnel shape. The upper face 22a has an inner cone shape whose inner diameter decreases downward. The flange part 22 includes the lower face 22b. The lower face 22b is a horizontal plane parallel to the liquid level FL0. The flange part 22 includes the outer side face 22c. The outer side face 22c is a cylindrical outer face. The flange part 22 includes plural grooves 22d for discharging the liquid fuel from a dish-shaped part defined by the upper face 22a.

Figure 8:
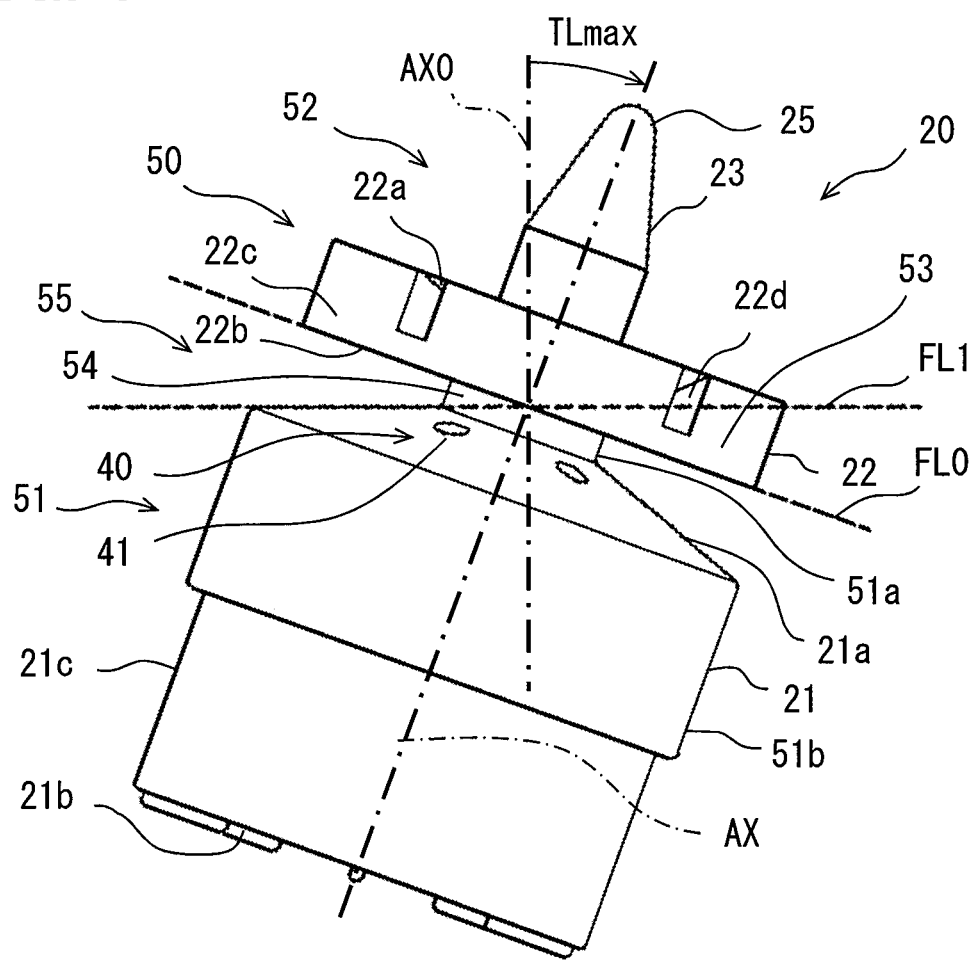
FIG. 8 is a side view illustrating the movable body according to the first embodiment.

FIG. 8 illustrates a tilt attitude of the movable body 20 tilted from a normal state by a tilt angle TLmax. The central axis AX is tilted from a central axis AX0 in the normal state by the tilt angle TLmax. The tilt attitude corresponds to the maximum allowable tilt required of the fuel control valve 8. Thus, the fuel control valve 8 is required to satisfy a predetermined function up to the tilt angle TLmax.

In the tilt attitude, a liquid level FL1 illustrated intersects the movable body 20. The liquid level FL1 passes above the upper face 21a. The liquid level FL1 passes through a part located below the flange part 22 in the downward direction DW in the tilt attitude. The liquid level FL1 in the tilt attitude is located along the upper face 21a and the upper face 22a. The liquid level FL1 is located along the upper face 21a on the floating side where the sinking part 51 approaches the liquid level FL1. The liquid level FL1 is located along the upper face 22a on the sinking side where the floating part 52 approaches the liquid level FL1.

The upper face 21a expands in a truncated cone shape so as to connect the first part 51a and the second part 51b to each other. The upper face 21a is located at a position below the liquid level FL1 or the same position as the liquid level FL1 regardless of the attitude of the movable body 20. The upper face 21a is an inclined plane which is inclined with respect to the up-down direction. The upper face 21a may include various planes such as a step surface or a concave curved surface.

The floating part 52 includes an additional sinking part 53 which sinks below the liquid level FL1 in addition to the sinking part 51 in the tilt attitude. The additional sinking part 53 is constituted of the flange part 22. The additional sinking part 53 is constituted of the radially outside part of the flange part 22. The additional sinking part 53 includes the lower face 22b of the flange part 22. The additional sinking part 53 is a part above the lower face 22b of the flange part 22. The additional sinking part 53 is a part of the flange part 22, the part sinking below the liquid level FL1. The additional sinking part 53 is a wedge solid. The additional sinking part 53 sinks below the liquid level FL1 to add buoyancy to the entire movable body 20.

The sinking part 51 includes an additional floating part 54 which floats up above the liquid level FL1 in addition to the floating part 52 in the tilt attitude. The additional floating part 54 is constituted of the first part 51a of the sinking part 51. The additional floating part 54 has a wedge shape. The additional floating part 54 gives a weight against the buoyancy of the movable body 20 to the movable body 20. As a result, the weight of the additional floating part 54 attempts to sink the entire movable body 20. The additional floating part 54 includes the float chamber 24 inside thereof. The additional floating part 54 is constituted of a part of the tubular first part 51a. Thus, the weight of the additional floating part 54 is smaller than the weight of a solid bar.

It can be said that the movable body 20 has an adjusting shape which adjusts the buoyancy given by the additional sinking part 53 and the weight given by the additional floating part 54. The adjusting shape is disposed on the sinking part 51 and includes the upper face 21a whose outer diameter decreases toward the liquid level FL0 in the normal attitude. The adjusting shape is located at the floating part 52, expands radially outside, and includes the flange part 22 which constitutes the additional sinking part 53. The adjusting shape includes the upper face 21a and the flange part 22.

The adjusting shape adjusts the buoyancy given by the additional sinking part 53 to equal to or larger than the weight given by the additional floating part 54. In other words, the buoyancy given by the additional sinking part 53 is larger than the weight given by the additional floating part 54. Accordingly, the movable body 20 attempts to float up in the tilt attitude relative to the normal attitude or as shifting from the normal attitude to the tilt attitude. Thus, a change in a valve open/closed state caused by the movable body 20 is restrained.

The buoyancy adjusting mechanism 50 has an adjusting shape. The adjusting shape includes a stepped shape 55 formed on the movable body 20. The stepped shape 55 is formed by the first part 51a, the upper face 21a, and the flange part 22. The stepped shape 55 inhibits an increase in the volume of the additional floating part 54 and facilitates an increase in the volume of the additional sinking part 53 while the liquid level changes from the liquid level FL0 to the liquid level FL1. The increase in the volume of the additional sinking part 53 is inhibited by the increase in the volume of the additional floating part 54. The above relationship is achieved by the diameter D1 of the first part 51a and the diameter D3 of the flange part 22. The liquid level FL0 passes through a narrow part formed by the stepped shape 55 in the normal attitude.

The movable body 20 includes a constriction between the main body 21 and the flange part 22. The stepped shape 55 is also called a constricted shape. The adjusting shape is disposed on the boundary between the sinking part 51 and the floating part 52.

When the movable body 20 tilts, the liquid fuel enters the air chamber including the float chamber 24. Thus, the displacement of the movable body 20 is reduced, which reduces the buoyancy. In the present embodiment, the volume of the additional sinking part 53 inhibits the up-and-down movement of the movable body 20 also against the reduction in the displacement of the movable body 20.

According to the present embodiment, there are cases where the movable body 20 floats in the normal attitude and where the movable body 20 floats in the tilt attitude. When the movable body 20 floats in the normal attitude, the liquid level is located at the first part 51a. The second part 51b is located below the first part 51a. The diameter D2 of the second part 51b is equal to or larger than the diameter D1 of the first part 51a. When the case 10 and the movable body 20 tilt, the liquid level FL moves with respect to the movable body 20. As a result, the radially outside part of the second part 51b attempts to float up above the liquid level. However, since the second part 51b is located below the first part 51a, the capacity of the second part 51b floating up from the liquid level is restrained. Further, since the diameter D2 of the second part 51b is equal to or larger than the diameter D1 of the first part 51a, the capacity of the first part 51a floating up from the liquid level by the tilt is also restrained. As a result, the influence of the tilt is reduced.

Figure 5:
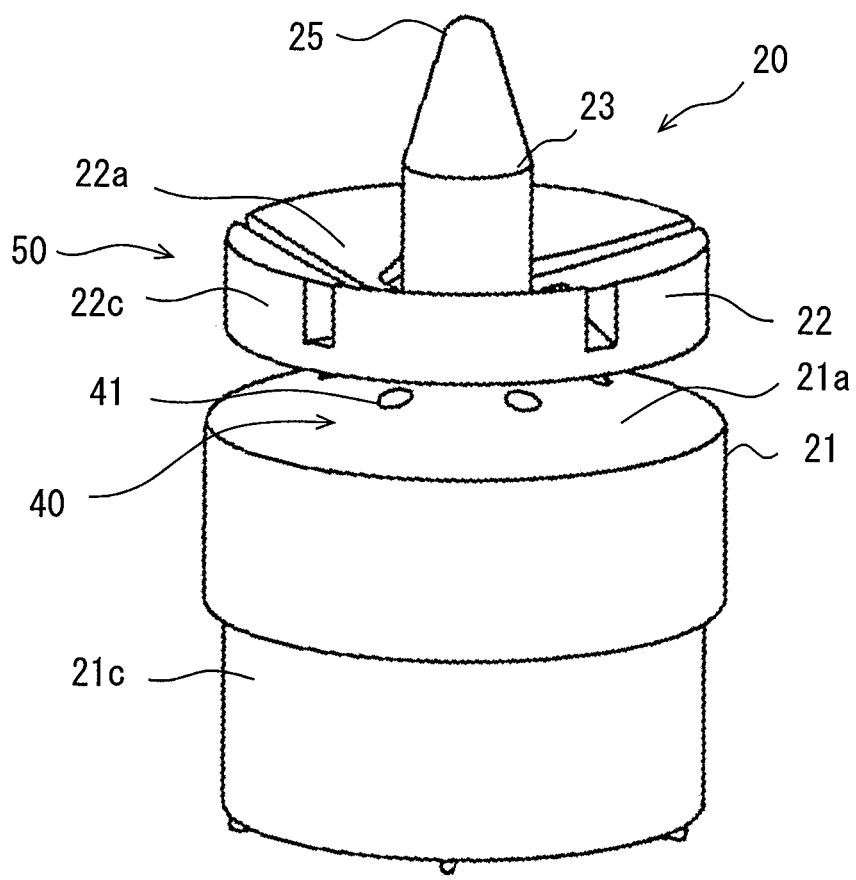
FIG. 5 is a perspective view illustrating a movable body according to the first embodiment.

The support shape 40 will be described in detail with reference to FIGS. 5 and 6. The plural through holes 41 are open on the upper face 21a. The plural through holes 41 are annularly disposed on the upper face 21a. The plural through holes 41 are disposed on a virtual circle which is smaller than the outer side face 22c. The plural through holes 41 are open facing the lower face 22b of the flange part 22. The flange part 22 includes the plural grooves 22d for discharging the liquid fuel from the upper face 22a.

The flange part 22 expands to cover the valve element surface 25 from the openings of the plural through holes 41. When the liquid fuel is blown out through the plural through holes 41, the flow of the liquid fuel is directed radially outside as indicated by an arrow by the lower face 22b. That is, the flange part 22 functions as a deflection member which deflects the flow. In another point of view, the flange part 22 provides a passage which is directed radially outward.

Figure 9:
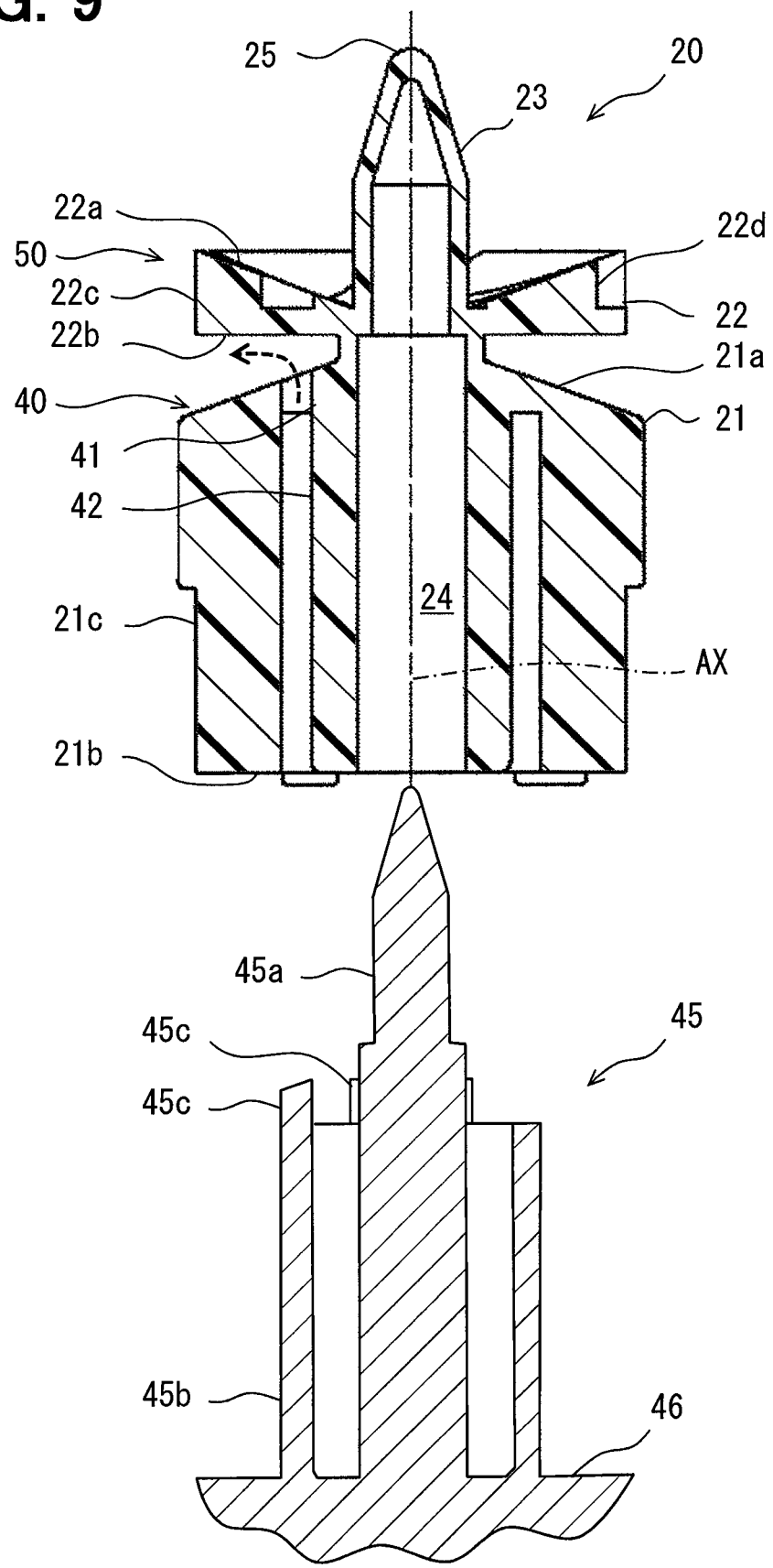
FIG. 9 is a cross-sectional view illustrating the movable body according to the first embodiment.

FIG. 9 illustrates a mold 45. The mold 45 is made of metal such as an iron-based alloy. The mold 45 has a higher thermal conductivity than resin. The movable body 20 has a mold trace formed by the mold 45.

The mold 45 includes a base part 46. The mold 45 includes a rod-like part 45a having a rod-like shape for forming the float chamber 24. The rod-like part 45a extends along the central axis AX from the base part 46. The mold 45 includes a tubular part 45b having a tubular shape for forming the annular part 42. The tubular part 45b extends along the central axis AX from the base part 46. The mold 45 includes plural pin parts 45c for forming the plural through holes 41. The plural pin parts 45c are located on the tip of the tubular part 45b. In the present embodiment, six through holes 41 are formed. Each of the plural pin parts 45c has a columnar shape. The plural pin parts 45c extend in the upward direction UP from the tubular part 45b. The plural pin parts 45c extend higher than the tubular part 45b.

The mold 45 is used in a method for manufacturing the fuel control valve 8. The method for manufacturing the fuel control valve 8 including the movable body 20 which opens and closes the fuel vapor passage includes a step of heating resin, a step of molding the movable body 20 from the heated resin using the mold 45 made of metal, and a step of releasing heat from the resin. The molding step forms the float chamber 24 which is located on the center of the movable body 20 by the rod-like part 45a. The molding step forms an annular resin block located radially outside the float chamber 24 by the tubular part 45b. The molding step forms the plural through holes 41 which penetrate the movable body 20 in the up-down direction by the plural pin parts 45c. The heat releasing step releases heat from the resin through the rod-like part 45a, the tubular part 45b, and the plural pin parts 45c. Thus, the mold 45 supports heat release from the resin in the resin molding step. The mold 45 is capable of molding the movable body 20 having high dimension accuracy.

According to the embodiment described above, the support shape 40 restrains the liquid fuel from reaching the valve. Thus, the outflow of the liquid fuel is restrained. In another point of view, since the support shape 40 is provided, the resin molding step for forming the movable body 20 is supported. As a result, it is possible to provide the movable body 20 as a relatively large resin block.

Figure 10:
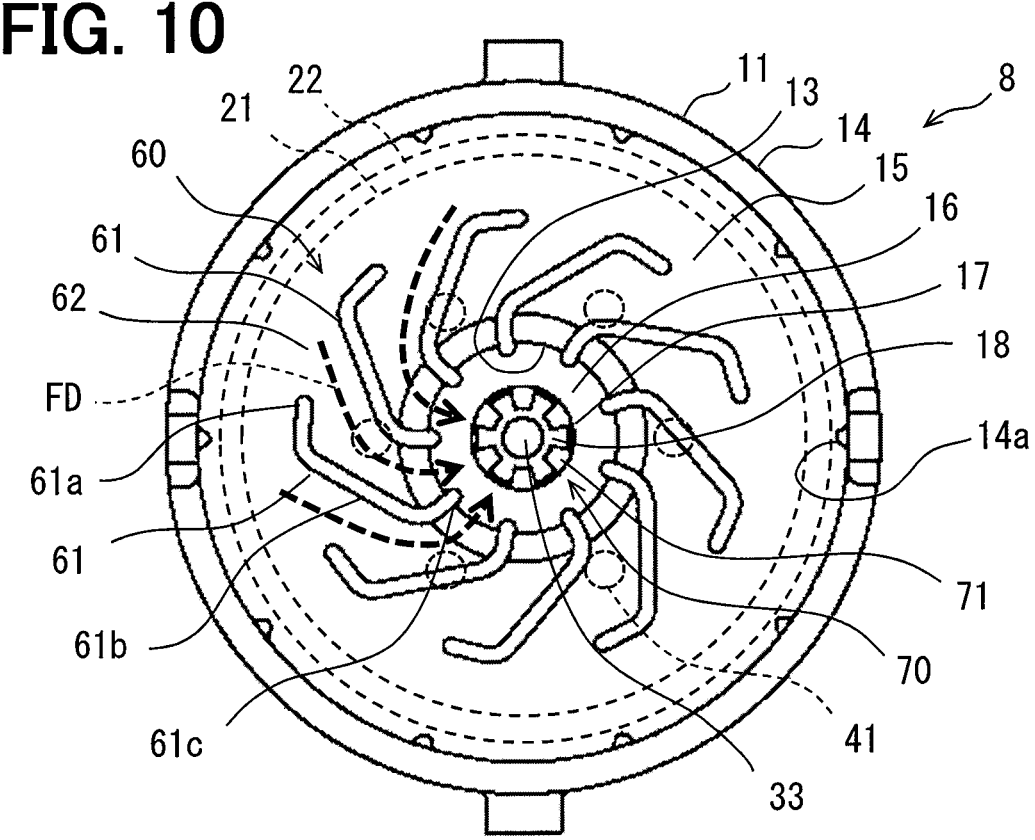
FIG. 10 is a bottom view illustrating inside of a case according to the first embodiment.

The barrier mechanism 60 will be described in detail with reference to FIG. 10. FIG. 10 illustrates the inside of the first case 11. In FIG. 10, the main body 21 and the flange part 22 are indicated by broken lines. Plural guide parts 14a for guiding the main body 21 are formed on the inner face of the large-diameter part 14. The guide parts 14a define a passage for air and fuel between the main body 21 and the large-diameter part 14. For example, the plural through holes 41 are located radially outside the inner face of the small-diameter part 13 as illustrated. Since the movable body 20 is rotatable, the positions of the plural through holes 41 are also movable in the circumferential direction.

The plural barrier walls 61 are disposed between the case 10 and the movable body 20. The plural barrier walls 61 are located above the movable body 20 in the illustrated normal attitude. Each of the plural barrier walls 61 is a plate-like member which extends toward the movable body 20 from the case 10. Each of the plural barrier walls 61 linearly extends in the up-down direction in the illustrated normal attitude. The plural barrier walls 61 surround the passage, that is, surround the valve seat surface 18. The plural barrier walls 61 overlap each other in the radial direction.

The plural barrier walls 61 radially extend. The plural barrier walls 61 are inclined with respect to the circumferential direction. Each of the barrier walls 61 is bent so as to project radially outside. Each of the barrier walls 61 has a bracket shape. The plural barrier walls 61 are inclined in the same direction with respect to the circumferential direction. The plural barrier walls 61 have a spiral shape extending in the radial direction from the central axis AX. The plural barrier walls 61 are located radially inside the range of the flange part 22.

Each of the barrier walls 61 includes a radial outer end 61a, an intermediate part 61b, and a radial inner end 61c. The radial outer end 61a is located on the step part 15. The barrier wall 61 extends from the radial outer end 61a while being directed in the circumferential direction. The intermediate part 61b is located on the inner face of the step part 15. A bent part which directs the barrier wall 61 radially inside is located between the radial outer end 61a and the intermediate part 61b. The intermediate part 61b obliquely extends while being directed in the circumferential direction and radially inside. The intermediate part 61b is substantially straight. The plural intermediate parts 61b are disposed in a spiral shape. The radial inner end 61c is located on the inner face of the small-diameter part 13. The barrier wall 61 extends from the intermediate part 61b toward the radial inner end 61c. A bent part which directs the barrier wall 61 radially inside is located between the radial inner end 61c and the intermediate part 61b. The barrier wall 61 gradually changes from a radial outer part which extends in the circumferential direction to a radial inner part which extends in the radial direction from the outer side toward the inner side in the radial direction.

The plural barrier passages 62 have a spiral shape in the radial direction from the central axis AX. When the movable body 20 is located near the valve closed position, the flange part 22 is located under the barrier passages 62. The barrier passage 62 generates a flow FD having a spiral shape. As illustrated, the flow FD does not flow straight from the radially inside toward the radially inside. Further, the spiral flow FD centrifuges splashes of the liquid fuel.

The plural barrier walls 61 are members that restrain waves on the liquid level FL inside the case 10. The plural barrier walls 61 restrain splashes toward the valve and the valve passage 33. The plural barrier walls 61 restrain the flow of splashes from linearly traveling toward the valve and the valve passage 33 from the radially outside toward the radially inside in the large-diameter part 14.

According to the embodiment described above, since the barrier mechanism 60 is provided, splashes of the liquid fuel toward the valve and the valve passage 33 are restrained. In one point of view, the plural barrier walls 61 restrain waves inside the case 10. Thus, the outflow of splashes caused by waves is restrained. In another point of view, the plural barrier walls 61 obstruct a straight flow from the radially outside toward the radially inside. Thus, the outflow of splashes is restrained.

Second Embodiment

A second embodiment is a modification based on the preceding embodiment. In the above embodiment, the plural barrier walls 61 have a shape that generates the spiral flow FD. Alternatively, in the present embodiment, a barrier wall having a shape that generates a meandering flow is employed. In another point of view, in the present embodiment, multiple-layer barrier walls are employed.

Figure 11:
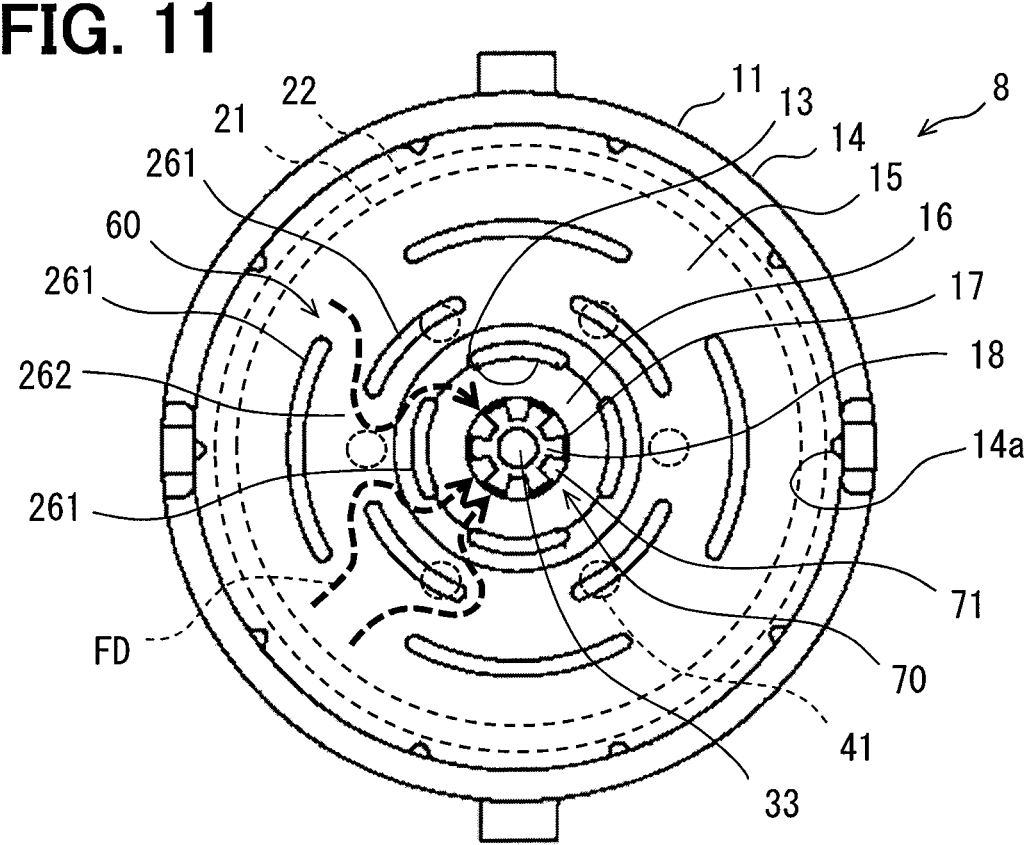
FIG. 11 is a bottom view illustrating inside of a case according to a second embodiment.

As illustrated in FIG. 11, a fuel control valve 8 includes a barrier mechanism 60. A first case 11 includes plural barrier walls 261. The barrier mechanism 60 includes the plural barrier walls 261 which are intermittently disposed to form one ring. In the illustrated example, four barrier walls 261 and four clearances are annularly disposed.

The barrier mechanism 60 includes the plural barrier walls 261 which are disposed in a multiple annular shape. In the illustrated example, the plural barrier walls 261 are disposed along a triple ring. The outermost ring includes the barrier walls 261 and the clearances which are alternately disposed. The intermediate ring includes the barrier walls 261 and the clearances which are alternately disposed. The innermost ring includes the barrier walls 261 and the clearances which are alternately disposed. The plural barrier walls 261 and the plural clearances are alternately disposed in the radial direction. The plural barrier walls 261 and the plural clearances form plural barrier passages 262. As a result, the plural barrier walls 261 overlap each other in a multiple manner in the radial direction from the central axis AX.

As a result, a flow FD meandering from the radially outside toward the radially inside is provided. Also in the present embodiment, waves and the outflow of splashes are restrained.

Third Embodiment

A third embodiment is a modification based on the preceding embodiments. In the above embodiments, the outer side face 22c is constituted of the cylindrical outer face. Alternatively, in the present embodiment, a flange part 22 is not provided with the outer side face 22c. In addition, in the above embodiments, the plural through holes 41 are open on the upper face 21a. Alternatively, in the present embodiment, plural through holes 241 are open on the boundary between a main body 21 and the flange part 22.

Figure 12:
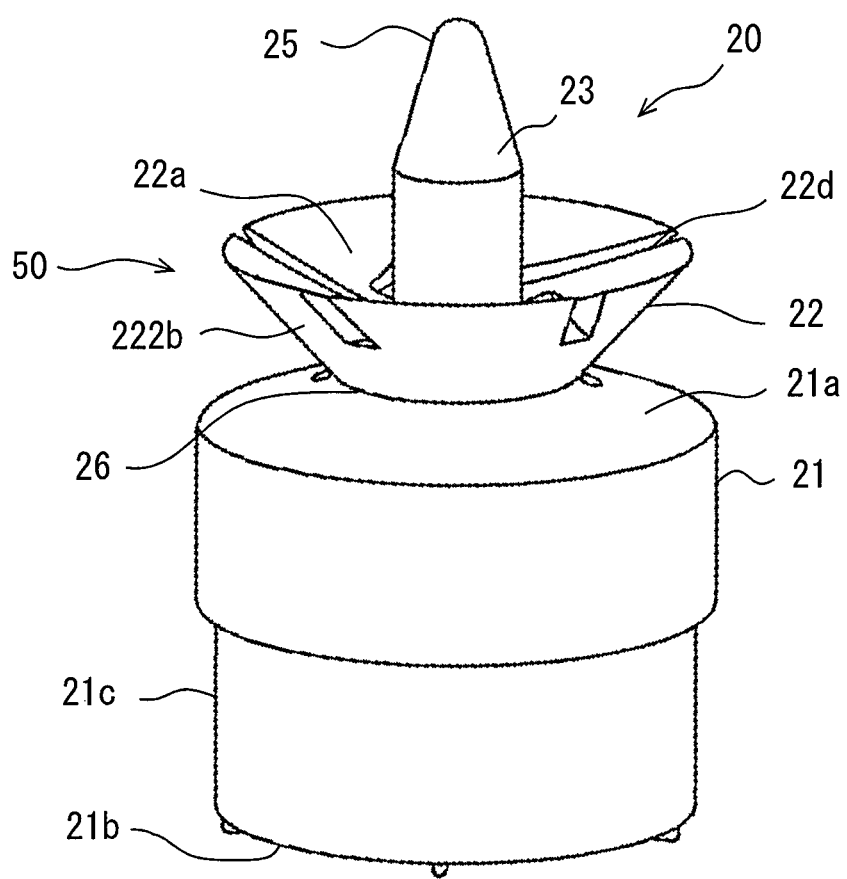
FIG. 12 is a perspective view illustrating a movable body according to a third embodiment.

In FIG. 12, the flange part 22 has a collar shape open upward. The flange part 22 includes a lower face 222b. The lower face 222b has a tilt angle larger than the tilt angle of the upper face 21a. The lower face 222b is constituted of a partial conical surface facing downward. An upper face 22a has a tilt angle corresponding to the tilt angle of the upper face 21a. The inclination angle of the upper face 22a is smaller than the inclination angle of the lower face 222b. As a result, the flange part 22 is a rotary body having a vertex on the upper part on the radially outside. In other words, the flange part 22 is not provided with the outer side face 22c.

The movable body 20 defines and forms the plural through holes 241. The plural through holes 241 extend from the inside of the main body 21 up to the intersection between the upper face 21a and the lower face 222b. The plural through holes 241 are open on the intersection. The plural through holes 241 are open throughout both the upper face 21a and the lower face 222b. Also in the present embodiment, the plural through holes 241 are open on the upper face 21a. The flange part 22 is disposed between the upper face 21a and a valve element surface 25.

The openings of the plural through holes 241 extend across both the upper face 21a and the lower face 222b. Thus, the openings of the through holes 241 are directed radially outside. When the liquid fuel is blown up through the plural through holes 241, the liquid fuel is blown out between the lower face 222b and the upper face 21a. The flow of the liquid fuel is directed radially outside as indicated by an arrow by the lower face 222b. In other words, the liquid fuel is blown radially outside. Also in the present embodiment, the flange part 22 provides a passage which is directed radially outside.

Figure 13:
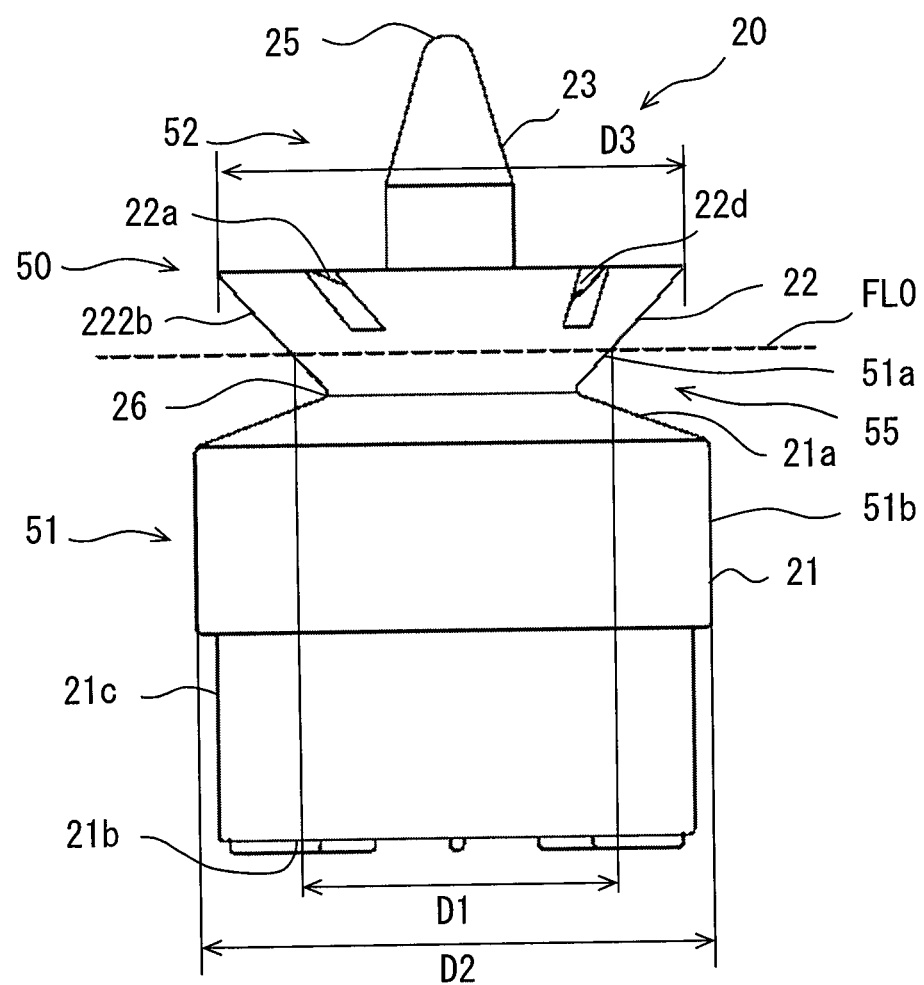
FIG. 13 is a side view illustrating the movable body according to the third embodiment.

In FIG. 13, the flange part 22 includes a part located above a liquid level FL0 and a part located below the liquid level FL0. The lower face 222b extends both up and down across the liquid level FL0. In other words, a part of the flange part 22 extends up to a sinking part 51. The lower part of the flange part 22 serves as a first part 51a. Thus, the most part of the flange part 22 is still located at a floating part 52.

The movable body 20 includes the sinking part 51 and the floating part 52. The sinking part 51 includes the first part 51a and a second part 51b. The first part 51a is continuously connected to the floating part 52.

The liquid level FL0 in a normal attitude of the movable body 20 is illustrated. When the movable body 20 freely floats on the liquid fuel, the liquid level FL0 extends at the illustrated position. The first part 51a where the liquid level FL0 is located in the normal attitude has a diameter D1. The second part 51b has a diameter D2. The liquid level FL0 crosses the first part 51a. The flange part 22 has a maximum diameter D3 on the uppermost part thereof. The liquid level FL0 intersects the lower face 222b. Such a shape increases the displacement according to the tilt of the lower face 222b when the movable body 20 moves in the downward direction DW. Thus, the movable body 20 on the liquid level FL0 is stabilized.

The movable body 20 includes a stepped shape 55 on the boundary between the sinking part 51 and the floating part 52. The liquid level FL0 passes through the inside of the stepped shape 55. The liquid level FL0 is located above the boundary. The liquid level FL0 is located in a part of the stepped shape 55 where the diameter decreases downward within the range of the lower face 222b. The stepped shape 55 serves as an adjusting shape.

Figure 14:
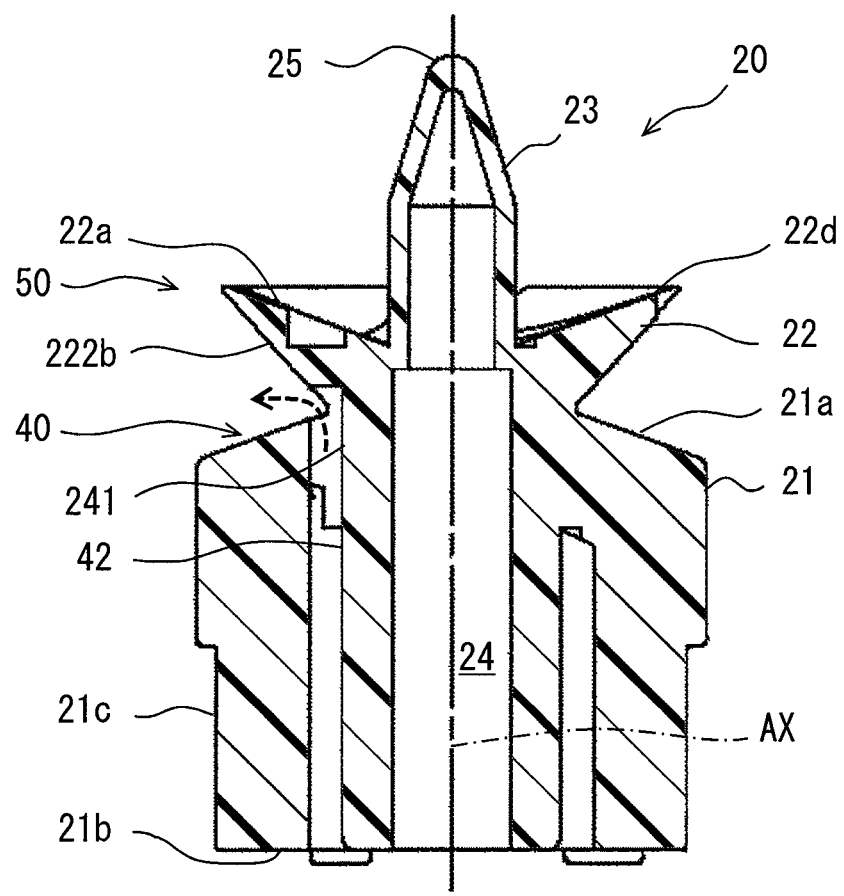
FIG. 14 is a cross-sectional view illustrating the movable body according to the third embodiment.

In FIG. 14, the through hole 241 is open on the boundary between the upper face 21a and the lower face 222b.

Figure 15:
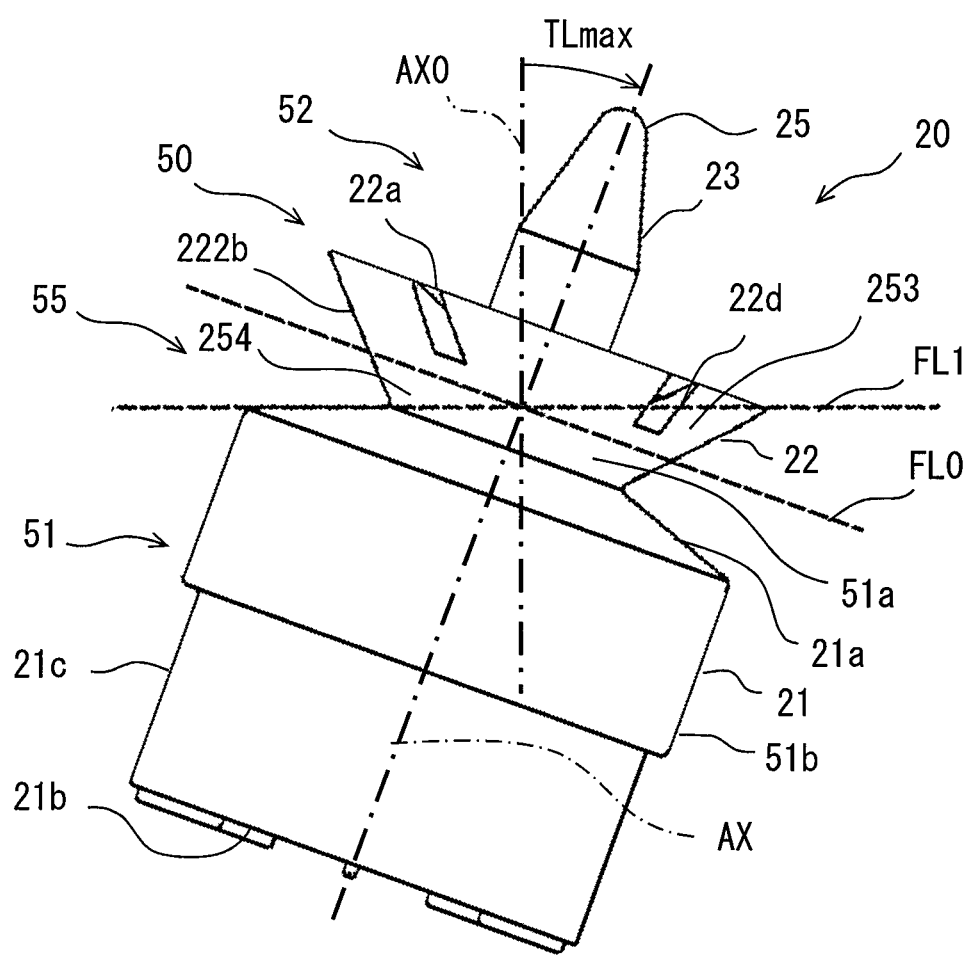
FIG. 15 is a side view illustrating the movable body according to the third embodiment.

FIG. 15 illustrates a tilt attitude of the movable body 20 tilted from the normal state by a tilt angle TLmax. The floating part 52 includes an additional sinking part 253 which sinks below a liquid level FL1 in addition to the sinking part 51 in the tilt attitude. The additional sinking part 253 sinks below the liquid level FL1 to add buoyance to the entire movable body 20.

The sinking part 51 includes an additional floating part 254 which floats up above the liquid level FL1 in addition to the floating part 52 in the tilt attitude. The additional floating part 254 is constituted of a part of the first part 51a. The first part 51a has an inverted truncated cone shape. The additional floating part 254 has a wedge shape occupying the circumferential range of the first part 51a.

The movable body 20 has an adjusting shape which adjusts the buoyancy given by the additional sinking part 253 and the weight given by the additional floating part 254. The adjusting shape includes the upper face 21a and the flange part 22. The adjusting shape is also the stepped shape 55. The adjusting shape adjusts the buoyancy given by the additional sinking part 253 to equal to or larger than the weight given by the additional floating part 254. In other words, the buoyancy given by the additional sinking part 253 is larger than the weight given by the additional floating part 254. Accordingly, a change in a valve open/closed state caused by the tilt is restrained. According to the present embodiment, the influence of the tilt is reduced.

Fourth Embodiment

A fourth embodiment is a modification based on the preceding embodiments. In the above embodiments, the movable body 20 has the flange part 22. Alternatively, in the present embodiment, a movable body 20 does not have the flange part 22. In the above embodiments, the plural through holes 41 are located on the annular part 42. Alternatively, in the present embodiment, a communication part 343 is formed between plural through holes 341 and an annular part 42.

Figure 16:
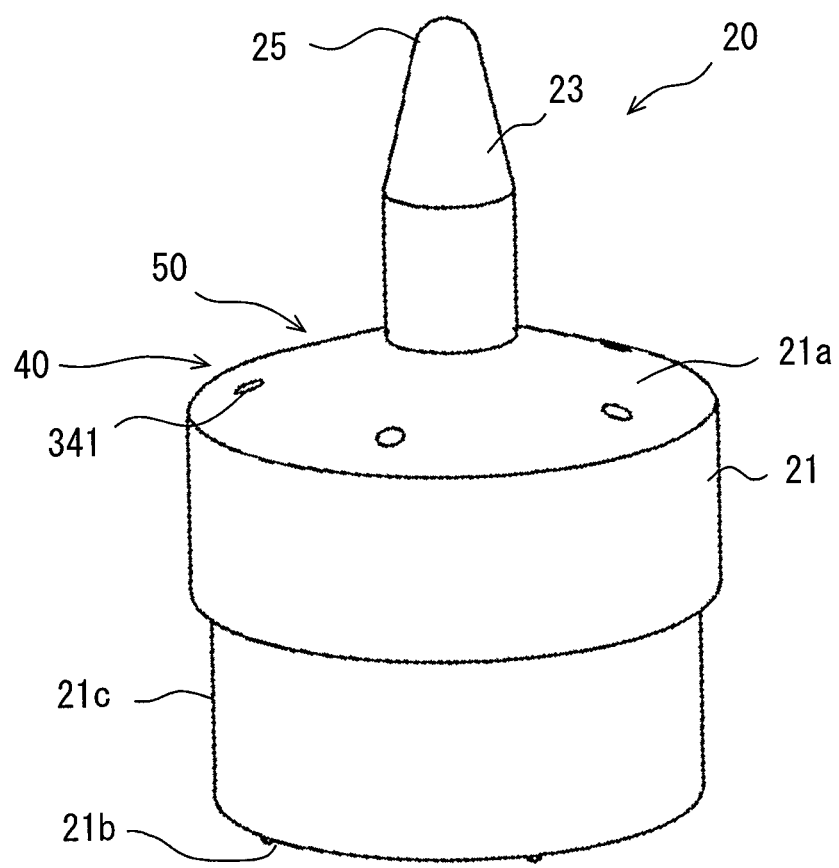
FIG. 16 is a perspective view illustrating a movable body according to a fourth embodiment.

In FIG. 16, the movable body 20 includes a main body 21 and a needle part 23. The movable body 20 is not provided with the flange part 22. The needle part 23 extends from the main body 21. The movable body 20 defines and forms the plural through holes 341. The plural through holes 341 extend inside the main body 21. The plural through holes 341 are open on an upper face 21a and a lower face 21b.

Figure 17:
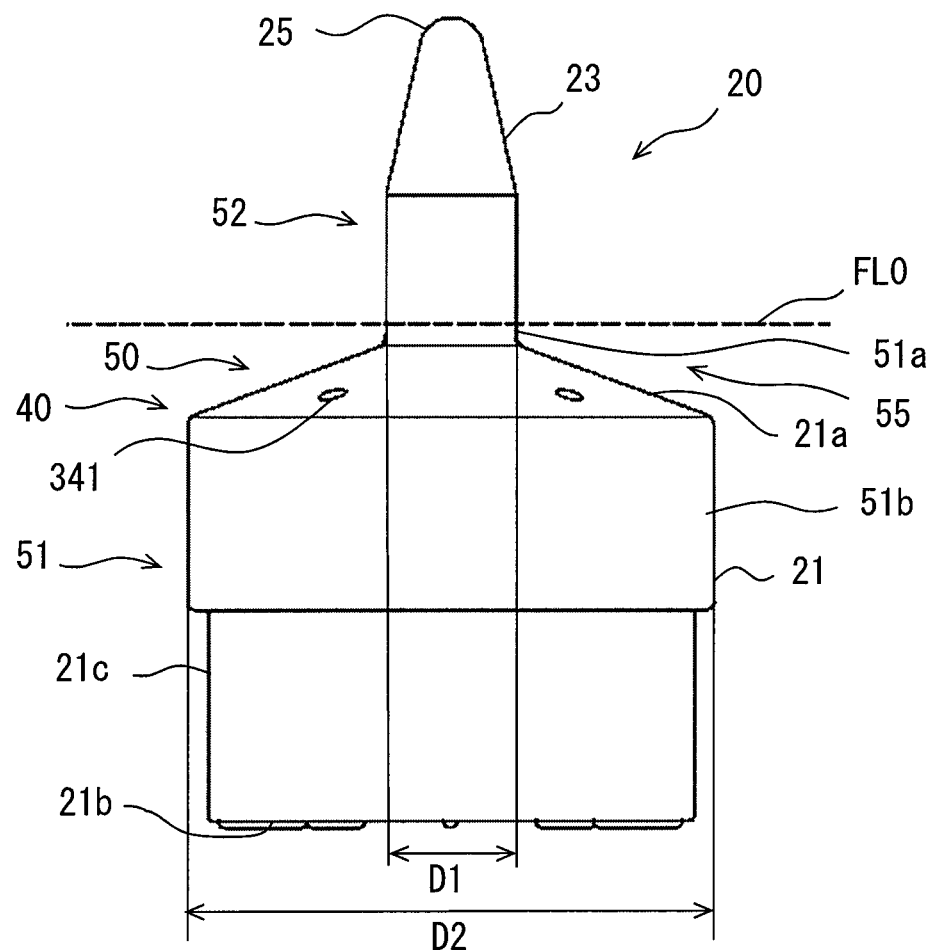
FIG. 17 is a side view illustrating the movable body according to the fourth embodiment.

In FIG. 17, the movable body 20 includes a sinking part 51 and a floating part 52. The sinking part 51 includes the first part 51a and a second part 51b. The first part 51a has a diameter D1. The diameter D1 is the diameter of the intersection between the first part 51a and a liquid level FL0. The second part 51b has a diameter D2.

Figure 18:
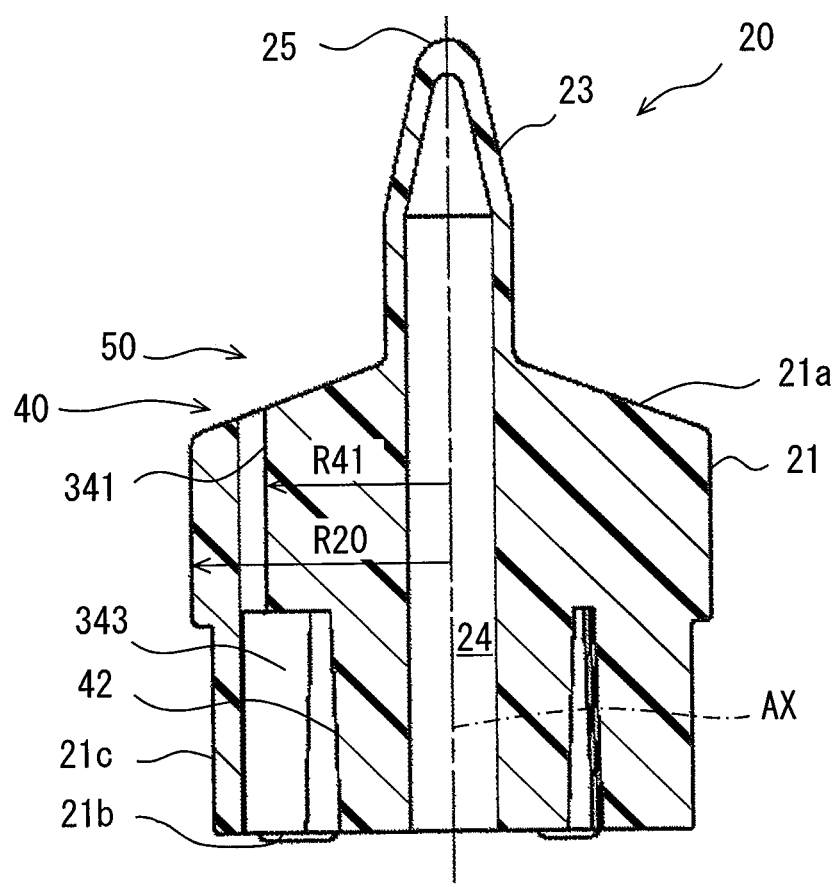
FIG. 18 is a cross-sectional view illustrating the movable body according to the fourth embodiment.

In FIG. 18, the plural through holes 341 are open on the radially outer side. The plural communication parts 343 are provided between the annular part 42 and the plural through holes 341. Accordingly, even when the liquid fuel is blown out through the plural through holes 341, the liquid fuel is discharged to the radially outside away from the valve element surface 25. The plural through holes 341 are disposed on a circle having a radius R41. The radius R41 is larger than ½ of a radius R20 of the main body 21.

Figure 19:
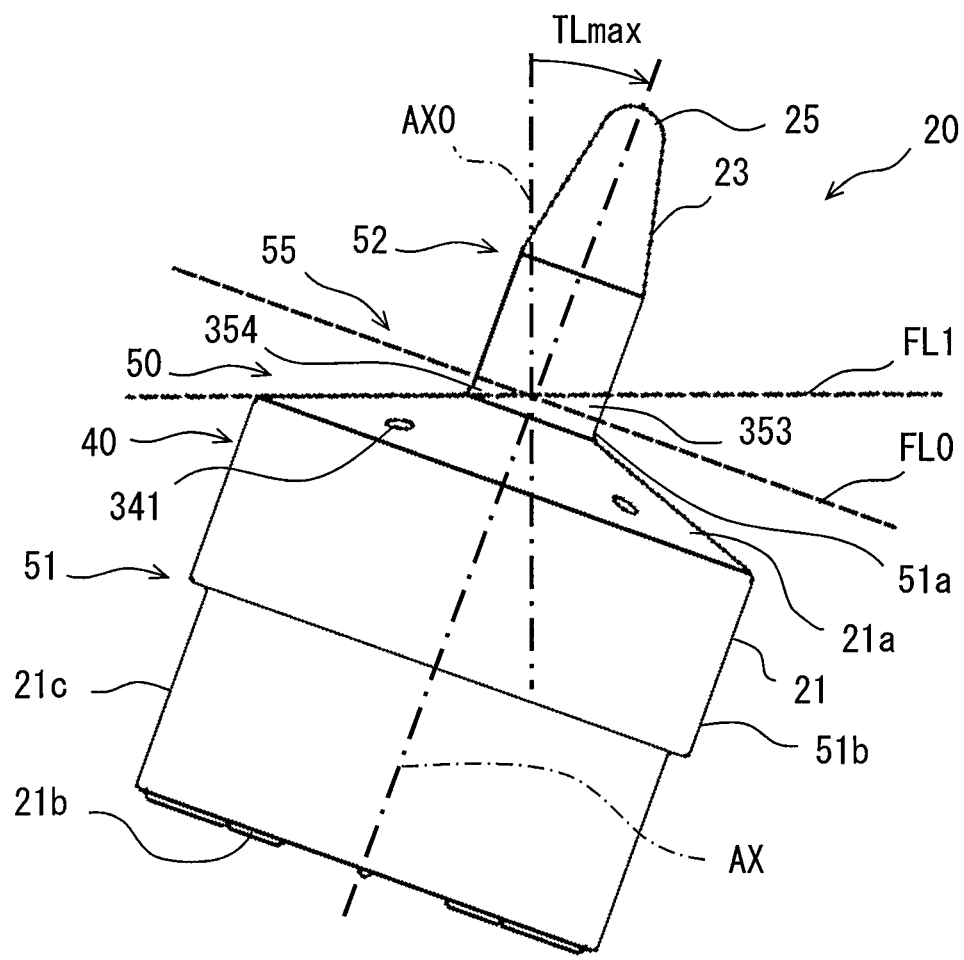
FIG. 19 is a side view illustrating the movable body according to the fourth embodiment.

FIG. 19 illustrates a tilt attitude of the movable body 20 tilted from the normal state by a tilt angle TLmax. The floating part 52 includes an additional sinking part 353 which sinks below a liquid level FL1 in addition to the sinking part 51 in the tilt attitude. The additional sinking part 353 sinks below the liquid level FL1 to add buoyance to the entire movable body 20. The additional sinking part 353 includes a float chamber 24 inside thereof. Thus, the additional sinking part 353 is lighter than a solid bar. The additional sinking part 353 is lightweight, but gives a buoyancy corresponding to the displacement thereof to the movable body 20.

The sinking part 51 includes an additional floating part 354 which floats up above the liquid level FL0 in addition to the floating part 52 in the tilt attitude. The additional floating part 354 is constituted of a part of the first part 51a. The first part 51a has a cylindrical shape. The additional floating part 354 has a wedge shape occupying the circumferential range of the first part 51a. The additional floating part 354 includes the float chamber 24 inside thereof. Thus, the additional floating part 354 is lighter than a solid bar.

The movable body 20 has an adjusting shape which adjusts the buoyancy given by the additional sinking part 353 and the weight given by the additional floating part 354. The adjusting shape includes the upper face 21a. The adjusting shape is also the stepped shape 55. The adjusting shape adjusts the buoyancy given by the additional sinking part 353 to equal to or larger than the weight given by the additional floating part 354. In other words, the buoyancy given by the additional sinking part 353 is larger than the weight given by the additional floating part 354. Accordingly, a change in a valve open/closed state caused by the tilt is restrained. According to the present embodiment, the influence of the tilt is reduced.

Figure 20:
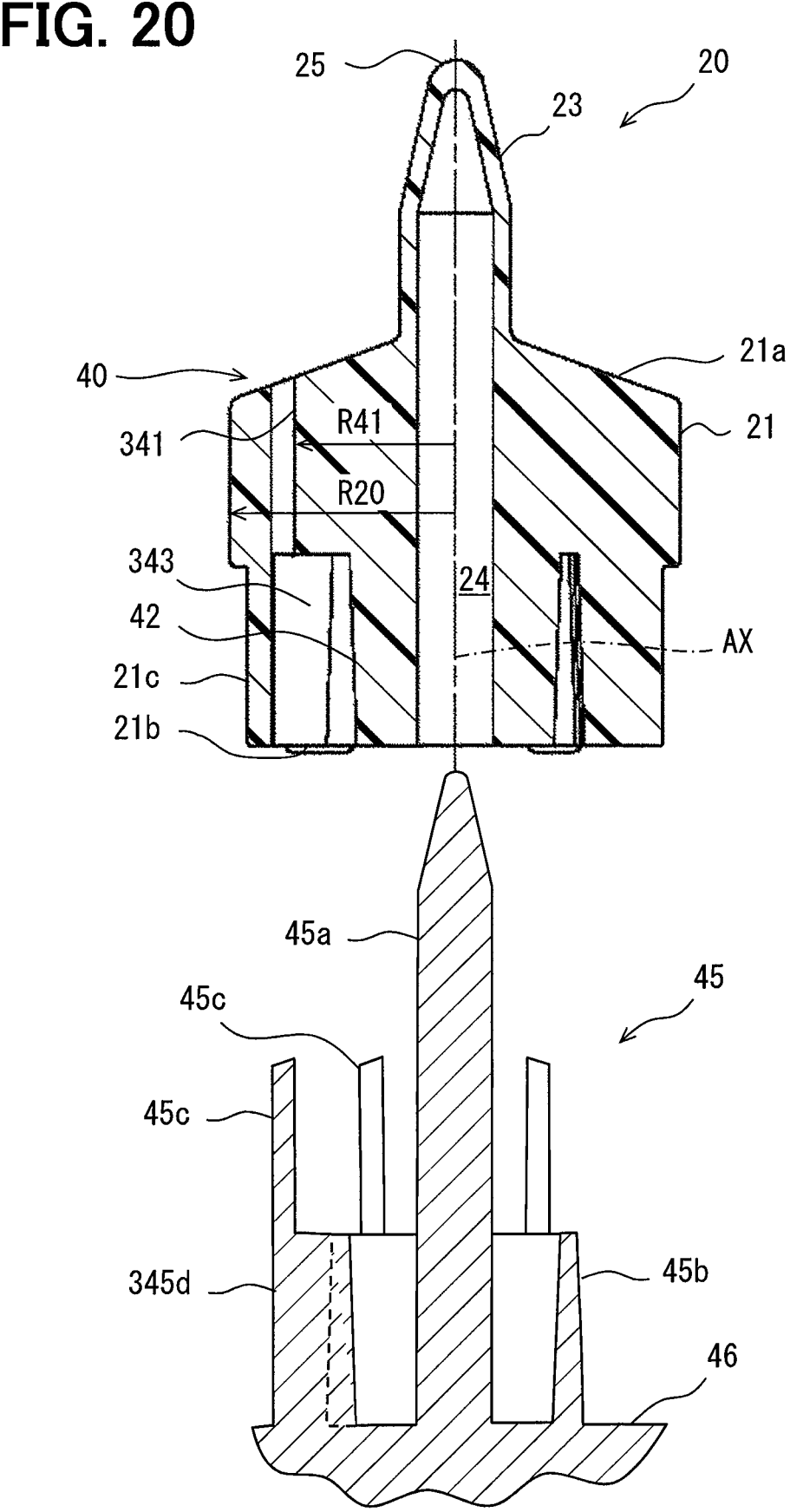
FIG. 20 is a cross-sectional view illustrating the movable body according to the fourth embodiment.

In FIG. 20, the movable body 20 includes the main body 21 and the needle part 23. The movable body 20 is not provided with the flange part 22. Thus, the movable body 20 is not provided with the buoyancy adjusting mechanism 50. The needle part 23 extends from the main body 21.

The movable body 20 defines and forms the plural through holes 341. The plural through holes 341 extend inside the main body 21. The plural through holes 341 are open on an upper face 21a and a lower face 21b. The plural through holes 341 are disposed on the radially outer part of the main body 21. The plural through holes 341 are located radially outside the float chamber 24. Radially inner edges of the plural through holes 341 are separated from the central axis AX of the movable body 20 by the radius R41. The radius R41 is smaller than the radius R20 of the movable body 20 and larger than ½ of the radius R20 (R20>R41>R20/2). The plural through holes 341 are located radially outside the position corresponding to ½ of the radius R20 of the main body 21. Since the plural through holes 341 are open on the radially outside, even when the liquid fuel is blown out, the liquid fuel is restrained from reaching the valve element surface 25.

The movable body 20 defines and forms the annular part 42. The communication parts 343 are provided between the through holes 341 and the annular part 42. The movable body 20 includes the plural communication parts 343 corresponding to the plural through holes 341. The plural communication parts 343 are radially disposed. The plural communication parts 343 radially extend from the annular part 42 to allow the annular part 42 and the plural through holes 341 to communicate with each other. The communication part 343 can also be called a plate-like cavity or a radial cavity.

A mold 45 includes a rod-like part 45a, a tubular part 45b, and plural pin parts 45c. Further, the mold 45 includes a plate-like part 345d. The plate-like part 345d is disposed between the tubular part 45b and the pin part 45c. The mold 45 includes plural plate-like parts 345d. The plural plate-like parts 345d are radially disposed. The plate-like part 345d is used for forming the communication part 343.

In the present embodiment, the movable body 20 includes the annular part 42 which is molded using the mold 45. The plural through holes 341 are located radially outside the annular part 42. The plural communication parts 343 allow the annular part 42 and the plural through holes 341 to communicate with each other. The mold 45 includes the plural plate-like parts 345d disposed between the tubular part 45b and the plural pin parts 45c. A molding step forms the plural communication parts 343 which allow the annular part 42 and the plural through holes 341 to communicate with each other by the plural plate-like parts 345d. A heat releasing step releases heat through the rod-like part 45a, the tubular part 45b, the plural pin parts 45c, and the plural plate-like parts 345d.

Also in the present embodiment, the plural through holes 341 are disposed on the radially outside of the main body 21. In other words, the plural through holes 341 are separated from the valve element surface 25 to the radially outside. Thus, the liquid fuel is restrained from reaching the valve element surface 25. Further, the plural through holes 341 accelerate heat release in the resin molding step.

Other Embodiment

The disclosure in this specification is not limited to the illustrated embodiment. The disclosure encompasses the illustrated embodiments and modifications by those skilled in the art based thereon. For example, the disclosure is not limited to the parts and/or combinations of elements shown in the embodiments. The disclosure can be implemented in various combinations. The disclosure may have additional parts that may be added to the embodiment. The disclosure encompasses omissions of parts and/or elements of the embodiments. The disclosure encompasses replacement or combination of parts and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

In the above embodiments, the fuel control valve 8 is not provided with a spring which biases the movable body 20 upward, that is, in the valve closing direction. Alternatively, the fuel control valve 8 may include a spring. The spring may be disposed in a compressed state between the case 10 and the movable body 20.

In the above embodiments, the fuel control valve 8 is attached to the tank 3. Alternatively, the fuel control valve 8 may be disposed inside the fuel vapor passage 7 when the liquid fuel may be returned to the tank 3.

In the above embodiments, the valve element surface 25 is integrally formed on the movable body 20. Alternatively, the movable body 20 and the valve element surface 25 may be formed as separate members. For example, the valve element surface 25 may be movable by a predetermined moving amount with respect to the movable body 20. The predetermined moving amount is also called play. The predetermined moving amount contributes to imparting the hysteresis characteristic to the valve opening characteristic. The valve element surface 25 may be formed on an elastic member having elasticity.

In the above embodiments, the valve seat surface 18 and the valve element surface 25 are constituted of linear tapered surfaces. Alternatively, the valve seat surface 18 and/or the valve element surface 25 may be constituted of a convex or concave curved surface.

In the above embodiments, the barrier walls 61, 261 are formed only on the case 10. Alternatively, the barrier walls 61, 261 may be formed also on the movable body 20. In this case, for example, the case 10 is provided with a tubular barrier which has a predetermined diameter and extends in the downward direction DW from the case 10. The movable body 20 is provided with a tubular barrier which has a diameter different from the predetermined diameter and extends in the upward direction UP from the movable body 20. In such a configuration, a flow meandering up-down direction is generated.

The fourth embodiment is not provided with the flange part 22. Alternatively, the fourth embodiment may be provided with the flange part 22. In this case, the plural through holes 341 may be open in the downward direction DW of the flange part 22. Further, the plural through holes 341 may be open radially outside the outer side face 22c of the flange part 22. In this manner, the elements of the illustrated embodiments can be combined with each other. Further, the elements of the illustrated embodiments can also be eliminated.

What is claimed is:
1. A fuel control valve comprising:
a case that provides a passage extending from a tank for storing fuel;

a movable body movably housed in the case to open or close the passage;

a valve seat surface defined in the case to have an inner cone shape whose inner diameter increases toward a tip;

a valve element surface that is operable by the movable body, the valve element surface being in contact with the valve seat surface along a seal line in a valve closed state, the valve element surface being separated from the valve seat surface in a valve open state;

a plurality of grooves disposed between the tip and the seal line to expand radially outside from the valve seat surface; and a plurality of projections that are defined between the grooves to intermittently leave the valve seat surface, wherein the movable body includes a needle part extending toward the valve seat surface, the valve element surface is defined at a tip part of the needle part, and the valve seat surface left on the plurality of projections guides the valve element surface at the tip part of the needle part.

2. The fuel control valve according to claim 1, wherein the valve seat surface left on the projections is in contact with the valve element surface in the valve open state.

3. The fuel control valve according to claim 1, wherein the valve seat surface left on the projections guides the valve element surface in the valve open state.

4. The fuel control valve according to claim 1, wherein the plurality of projections extend longer than a moving range of the valve element surface.

5. The fuel control valve according to claim 1, wherein the plurality of grooves are radially formed.

6. The fuel control valve according to claim 1, wherein the movable body is a float floating on a liquid level of the fuel, the movable body includes a sinking part that sinks below the liquid level in a normal attitude, and the sinking part includes:
  a first part having a predetermined diameter, the liquid level in the normal attitude passing through the first part; and
  a second part located below the first part, the second part having a diameter larger than or equal to the diameter of the first part.

7. The fuel control valve according to claim 1, wherein the movable body is a molded article made of resin, and includes:
  a float chamber formed using a mold; and
  a plurality of through holes passing through the movable body in an up-down direction and formed using the mold, and the plurality of through holes are located radially outside the float chamber.

8. The fuel control valve according to claim 1, wherein each of the plurality of grooves is defined by two side faces and a bottom face, and an intersection between the bottom face and the valve seat surface is provided by a plurality of edges each having a curved surface shape.

9. The fuel control valve according to claim 8, wherein the seal line has a perfect annular shape, and the plurality of edges are defined in an area between the tip and the seal line, and are located immediately near the seal line.

10. A fuel control valve comprising:

a case that provides a passage extending from a tank for storing fuel;

a movable body movably housed in the case to open or close the passage;

a valve seat surface defined in the case to have an inner cone shape whose inner diameter increases toward a tip;

a valve element surface that is operable by the movable body, the valve element surface being in contact with the valve seat surface along a seal line in a valve closed state, the valve element surface being separated from the valve seat surface in a valve open state;

a plurality of grooves disposed between the tip and the seal line to expand radially outside from the valve seat surface; and a plurality of projections that are defined between the grooves to intermittently leave the valve seat surface, wherein the case includes:
  a partition wall that partitions the passage; and
  a tubular part extending from the partition wall, the valve seat surface is an inner side face of the tubular part, and the plurality of grooves radially extend on the tubular part, and are open on an outer side face of the tubular part and the valve seat surface.

11. The fuel control valve according to claim 10, wherein the case includes:
  a small-diameter part having a predetermined diameter;
  a large-diameter part having a larger diameter than the small-diameter part, the large-diameter part housing the movable body; and
  a step part that connects the small-diameter part and the large-diameter part to each other, and the partition wall is disposed inside the small-diameter part.

12. A fuel control valve comprising:

a case that provides a passage extending from a tank for storing fuel;

a movable body movably housed in the case to open or close the passage;

a valve seat surface defined in the case to have an inner cone shape whose inner diameter increases toward a tip;

a valve element surface that is operable by the movable body, the valve element surface being in contact with the valve seat surface along a seal line in a valve closed state, the valve element surface being separated from the valve seat surface in a valve open state;

a plurality of grooves disposed between the tip and the seal line to expand radially outside from the valve seat surface;

a plurality of projections that are defined between the grooves to intermittently leave the valve seat surface; and a plurality of barrier walls disposed between the case and the movable body to surround the passage, the plurality of barrier walls being plate-like members extending between the case and the movable body.

* * * * *